US012516554B2

(12) United States Patent
Attleson et al.

(10) Patent No.: US 12,516,554 B2
(45) Date of Patent: Jan. 6, 2026

(54) REFUSE COLLECTION VEHICLE TAILGATE LOCK SYSTEM

(71) Applicant: Con-Tech Manufacturing, Inc., Dodge Center, MN (US)

(72) Inventors: Jay Attleson, Rochester, MN (US); Grant McNeilus, Dodge Center, MN (US); Garwin McNeilus, Dodge Center, MN (US)

(73) Assignee: Con-Tech Manufacturing, Inc., Dodge Center, MN (US)

( * ) Notice: Subject to any disclaimer, the term of this patent is extended or adjusted under 35 U.S.C. 154(b) by 167 days.

(21) Appl. No.: 18/312,996

(22) Filed: May 5, 2023

(65) Prior Publication Data
US 2024/0368927 A1 Nov. 7, 2024

(51) Int. Cl.
| | |
|---|---|
| *E05B 81/12* | (2014.01) |
| *B65F 3/02* | (2006.01) |
| *E05B 81/10* | (2014.01) |
| *E05B 81/18* | (2014.01) |
| *E05B 81/28* | (2014.01) |
| *E05B 83/00* | (2014.01) |
| *E05F 15/53* | (2015.01) |
| *B65F 3/00* | (2006.01) |

(52) U.S. Cl.
CPC .............. *E05B 81/13* (2013.01); *B65F 3/02* (2013.01); *E05B 81/10* (2013.01); *E05B 81/18* (2013.01);
(Continued)

(58) Field of Classification Search
CPC .......... E05B 81/10; E05B 81/13; E05B 81/18; E05B 81/28; E05B 83/00; E05B 83/42;
(Continued)

(56) References Cited

U.S. PATENT DOCUMENTS

| | | | | | |
|---|---|---|---|---|---|
| 3,757,969 | A | * | 9/1973 | Smith ....................... | B65F 3/00 49/245 |
| 4,194,787 | A | * | 3/1980 | Williamsen ............... | B60P 1/16 298/17 R |

(Continued)

FOREIGN PATENT DOCUMENTS

JP          2018131736 A  *  8/2018

*Primary Examiner* — Kristina R Fulton
*Assistant Examiner* — James Edward Ignaczewski
(74) *Attorney, Agent, or Firm* — Craig J. Lervick; Larkin Hoffman Daly & Lindgren, Ltd.

(57) ABSTRACT

A locking assembly can achieve positive locking of a tailgate, by including a guideblock having a guide slot defined therein, a lockplate configured to be slidably received within the guide slot, and a clevis that is configured to operatively cooperate with the lockplate. A locking hook formed in the lockplate will capture a pin in the clevis to achieve the desired locking capabilities. A capture pin is removably coupled to the guideblock and positioned within a containment in the lockplate to control travel. An actuator is coupled at one end to a portion of the vehicle and at the other end to the lockplate in a manner to cause movement of the lockplate and subsequent movement of the tailgate in an opening direction. The actuator is further configured to cause the tailgate to move in a closing direction until reaching a closed position and then moving the lockplate from an unlocked position to a locked position, thus causing the locking hook to capture the pin in the clevis and further causing the tailgate to be positively locked.

20 Claims, 20 Drawing Sheets

(52) U.S. Cl.
CPC .............. *E05B 81/28* (2013.01); *E05B 83/00* (2013.01); *E05F 15/53* (2015.01); *B65F 2003/006* (2013.01); *B65F 2003/0269* (2013.01); *E05Y 2201/454* (2013.01); *E05Y 2800/10* (2013.01); *E05Y 2900/516* (2013.01); *E05Y 2900/546* (2013.01)

(58) Field of Classification Search
CPC .......... E05B 85/04; E05B 85/22; E05F 15/53; B65F 3/00; B65F 3/02; B65F 2003/006; B65F 2003/0269; B60P 1/16
USPC .......................................................... 292/95
See application file for complete search history.

(56) References Cited

U.S. PATENT DOCUMENTS

| | | | | |
|---|---|---|---|---|
| 4,627,783 A * | 12/1986 | De Filippi | ................ | B65F 3/00 |
| | | | | 414/513 |
| 4,665,649 A * | 5/1987 | Hund, Jr. | ................. | B65F 3/00 |
| | | | | 298/23 S |
| 5,158,340 A * | 10/1992 | Boda | ......................... | B65F 3/00 |
| | | | | 298/23 M |
| 5,335,958 A | 8/1994 | Christenson et al. | | |
| 5,480,214 A * | 1/1996 | Rogers | ..................... | B60P 1/28 |
| | | | | 296/183.2 |
| 5,498,067 A | 3/1996 | Christenson | | |
| 5,816,766 A * | 10/1998 | Clark | ........................ | B65F 3/28 |
| | | | | 414/525.3 |
| 6,106,072 A * | 8/2000 | Lutter, Jr. | ................ | B60P 1/165 |
| | | | | 298/17.5 |
| 6,123,347 A | 9/2000 | Christenson | | |
| 6,234,739 B1 | 5/2001 | Smith et al. | | |
| 6,666,491 B2 | 12/2003 | Schrafel | | |
| 7,350,873 B2 * | 4/2008 | Bibeau | .................... | E05C 19/10 |
| | | | | 298/23 M |
| 8,414,083 B2 * | 4/2013 | Dunker | ..................... | B60P 1/26 |
| | | | | 296/56 |
| 10,137,944 B2 * | 11/2018 | Steege | ................. | B62D 33/037 |
| 10,385,605 B2 * | 8/2019 | Limke | ................. | A01F 15/0875 |
| 2015/0175353 A1 | 6/2015 | Gillmore et al. | | |
| 2018/0252004 A1* | 9/2018 | Bishop | ................... | E05B 81/18 |

\* cited by examiner

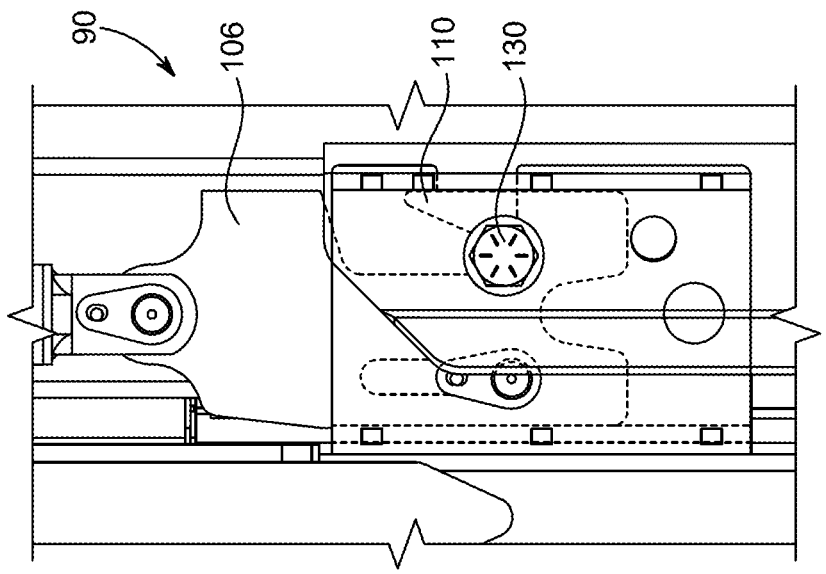
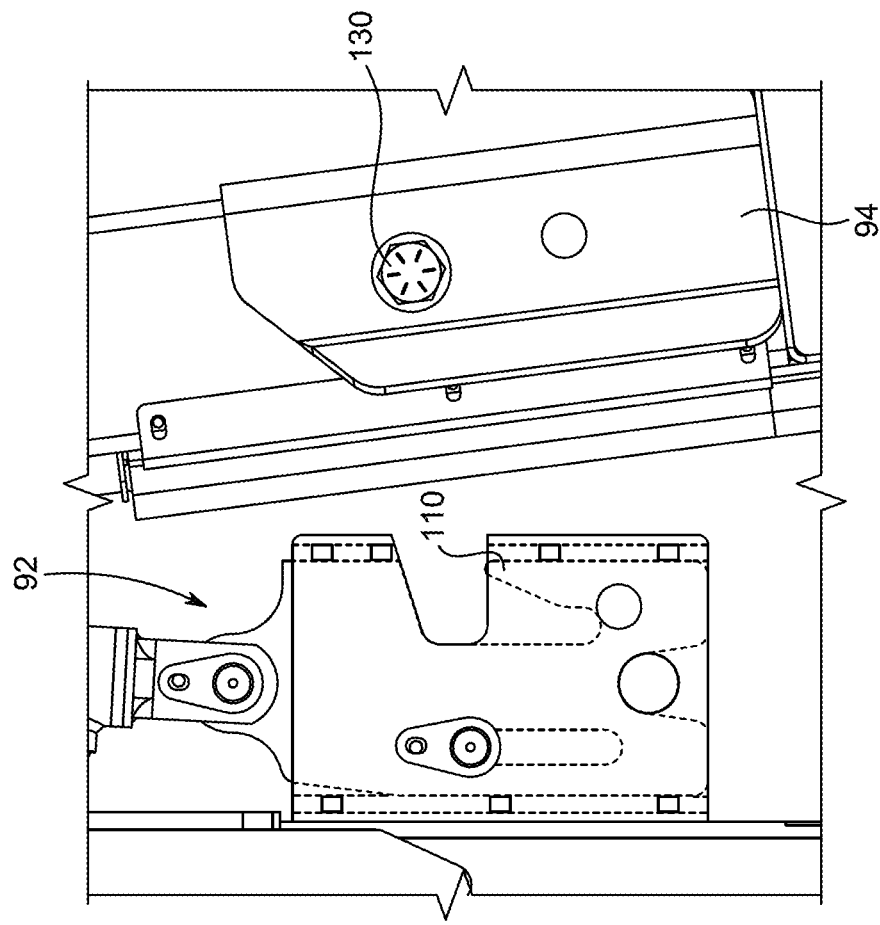

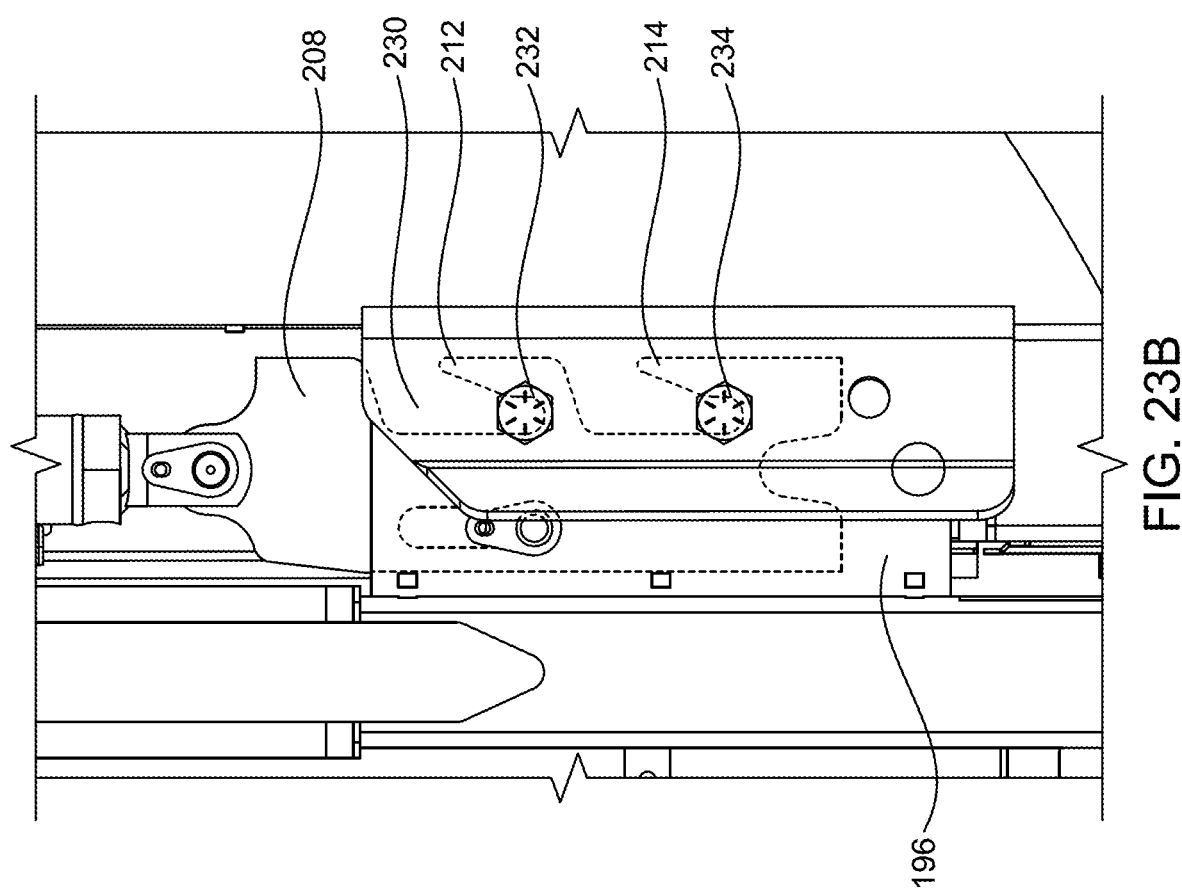

REFUSE COLLECTION VEHICLE TAILGATE LOCK SYSTEM

BACKGROUND

Although several different types of refuse collection vehicles exist, they all generally include a main collection body having a collection container configured to store refuse as it is collected. Additionally, these vehicles typically have a rear eject or dump capabilities to unload collected refuse when the collection container is full, or at the end of a collection day. The eject, dump or unload process typically involves the opening of a tailgate, positioned at a rear portion of the refuse vehicle, and either tipping the refuse container, or using an ejection mechanism to cause refuse to be discharged from the rear of the vehicle. In use, it is critical that the tailgate is positively locked during normal collection operations. This is required because packing and compression of collected refuse usually takes place throughout a collection route, and often creates extreme pressure to be exerted on the rear tailgate itself.

Many different lock mechanisms have been previously used on refuse collection vehicles, often involving manual latches, or complex locking structures having several interrelated components. The incorporation and/or inclusion of complex systems and additional components is clearly undesirable as this allows for failures and potential inherent problems. Further, manual locking mechanisms increase labor requirements, and require drivers/operators to interact with mechanical systems, potentially creating an additional possibility for injury.

Based on existing systems and the continued desire for efficiency, automation, simplified systems, and improved safety, it is desirable to have an automatic locking mechanism that would make use of existing components, and which minimizes the need for user interaction. Such a system would provide positive locking of the tailgate without adding complexity to the refuse collection vehicle

SUMMARY

To provide efficient and effective operation, various embodiments of an automated locking system to be used as part of a refuse collection vehicle are outlined below. As will be further discussed in detail, the locking mechanism makes use of the existing tailgate actuator mechanisms and is included or incorporated as an additional system that is largely self-contained and includes a minimum number of parts.

In some aspects, the techniques described herein relate to locking assembly, having a locking mechanism and a clevis that work together to provide for positively locking a tailgate coupled to a vehicle. The locking mechanism generally has a guideblock coupled to the vehicle having an inner wall, an outer wall, an opening at an upper end thereof, and a guide slot defined by the outer wall and the inner wall. A lock notch opening is also positioned in a side portion of the guideblock. A lock plate is configured to be slidably received within the guide slot, with the lock plate having a containment slot and a locking hook formed therein. The lock plate is slidably movable between a locked position and an unlocked position to achieve opening, closing, and locking. A capture pin is removably coupled to the guideblock and positioned within the containment slot, wherein the capture pin is positioned at a first end of the containment slot when the lock plate is in the locked position and positioned at a second end of the containment slot when the lock plate is in the unlocked position.

A lock clevis is generally formed as part of the tailgate and is configured to support a locking pin. An actuator is coupled to the tailgate and the lock plate, with the actuator configured to move in an expanding direction which will provide an opening force causing the lock plate to move in a first direction until the lock plate reaches the unlocked position. The actuator further configured to continue providing the opening force which will cause the tailgate to move in an opening direction. The actuator is further configured to move in a contracting direction (when the tailgate is open) which will cause the tailgate to move in a closing direction until reaching a closed position. The actuator is further configured to continue moving in the contracting direction thereby causing the lock plate to move from the unlocked position to the locked position. When the tailgate is in the closed position, the lock clevis and the guideblock are positioned such that the lock clevis will partially surround the guideblock and the lock pin will be positioned within the lock notch opening. The lock pin is captured by the locking hook when the lock plate is moved from the unlocked position to the locked position, and holding the tailgate in the locked position, thus pulling the tailgate to a locked position.

In some embodiments, the locking hook has an angled capture surface configured to generate a closing force which will draw the tailgate inwardly as the lock plate moves from the unlocked position to the locked position. Further, some embodiments have the locking pin configured as a bolt coupled to the clevis in a manner that allows for rotation thereof as the locking pin interacts with the locking hook. To make this work efficiently, the locking hook is formed in a side portion of the lock plate and includes an opening slot. The angled capture surface is positioned adjacent the opening slot.

In some aspects, the lock plate further includes a second locking hook and the lock clevis supports a second locking pin, and wherein the second locking pin is captured by the second locking hook as the lock plate is moved from the unlocked position to the locked position.

In some embodiments, the locking mechanism cooperates with the tailgate which is rotatably coupled to the rear portion of the refuse collection truck by a hinge positioned at an upper location of the rear portion, and wherein the tailgate swings upwardly when moving from the closed position to the open position.

In other aspects, the techniques and systems described herein relate to a locking assembly carried by a refuse collection vehicle for locking a tailgate in a locked position and for allowing the tailgate to be unlocked and thus moved to an open position. The locking assembly of one embodiment includes: a lock clevis coupled to the tailgate and supporting a locking pin, a guideblock coupled to a body portion of the refuse collection vehicle. with the guideblock having a guide slot therein and a lock notch positioned in a side portion thereof. The guide slot is configured to receive the locking pin when the tailgate is in a closed position. A lock plate is configured to be received within the guide slot of the guideblock and movable between a lock position and an unlock position, with the lock plate having a containment slot therein and a locking hook positioned in a side portion thereof. A capture pin is configured to be received within an opening in the guideblock, and within the containment slot of the lock plate. The capture pin and the containment slot are cooperatively configured to allow the lock plate to move within the guideblock between the lock position and the unlock position. An actuator is coupled at a first end to the lock plate and at a second end to the tailgate, with the actuator configured to provide an opening force which, when the lock plate is in the lock position, will cause the lock plate to move to the unlock position and then will cause movement of the tailgate in an opening direction. The actuator further configured to provide a closing force which will cause the tailgate to move in a closing direction until reaching a closed position where the lock clevis will partially surround the guideblock and the locking pin is positioned within the lock notch. The actuator will continue to provide a closing force causing the lock plate to move to the lock position. Moving the lock plate from the unlock position to the lock position will cause the locking hook to catch the locking pin and pull the tailgate to the locked position.

To accommodate efficient operation, some embodiments use a bolt as the locking pin, which is coupled to the lock clevis in a manner that allows for rotation. Further, the locking hook has a sloped surface which will contact the locking pin when the lock plate moves from the unlock position to the lock position, and the locking pin is allowed to roll on the sloped surface.

In some embodiments, the techniques described herein relate to a locking mechanism where the actuator is a hydraulic cylinder, although several alternatives are possible.

BRIEF DESCRIPTION OF THE DRAWINGS

Further objects and advantages of the exemplary locking mechanism are outlined in the description below in conjunction with the drawings, in which:

FIG. 6 is a side view of the lock mechanism, with FIG. 6A presenting the lock mechanism in the open/un-locked position while

FIGS. 9A and 9B show a sectional side view of the lock assembly of FIGS. 3 and 4 above, showing the position of various elements in the unlocked and locked positions, respectively;

FIG. 10 represents a rear portion of the rear loader refuse collection vehicle, with FIG. 10A presenting a view of the tailgate in a partially opened position, while

FIG. 13 presents a side view of the lock mechanism with FIG. 13A showing the lock mechanism in the open/unlocked position, while

FIG. 17 presents a rear portion of a front loader refuse collection vehicle, with FIG. 17A showing the tailgate of the front loader refuse collection vehicle in a partially open position, while

FIGS. 23A and 23B show the position of the various component of the locking assembly of FIGS. 17 and 18 in locked and unlocked positions.

DESCRIPTION

Collection of refuse using a refuse collection vehicle is typically achieved by depositing such refuse into a collection hopper of some type, and subsequently transferring the collected refuse into a main collection, which is often positioned at the rear portion of a refuse collection vehicle. While many variations exist, refuse collection vehicles typically fall into three categories: (1) a front loader refuse collection vehicle; (2) a side load refuse collection vehicle; and (3) a rear loader refuse collection vehicle. As the names suggest, these vehicles accommodate the collection and loading of refuse into the vehicle from the front, side, or rear, respectively. Once refuse is collected, it is then transferred to the main collection housing, which again is typically positioned towards the rear of the refuse collection vehicle. Additionally, a compaction mechanism is often provided within the main collection housing, to compact refuse as its collected on a refuse collection route, thereby extending the capacity of the vehicle.

Once the main collection housing has reached its capacity, it is necessary for the vehicle to be unloaded or dumped at an appropriate location or facility. To accommodate dumping, a tailgate mechanism of some type is typically situated at the rear of the refuse collection vehicle. Once the tailgate is opened, refuse can be dumped or ejected by either lifting the main collection body, thereby allowing gravity to cause refuse to be dumped, or, utilizing an ejection mechanism which will push refuse out a rear opening in the main collection body.

As the discussion above highlights, it is necessary for the tailgate to be opened and closed as necessary to accommodate dumping/ejections of collected refuse. Further, it is desired to have the tailgate positively locked during operation, thus containing the collected refuse within the vehicle until dumping operations are initiated.

Figure 1:
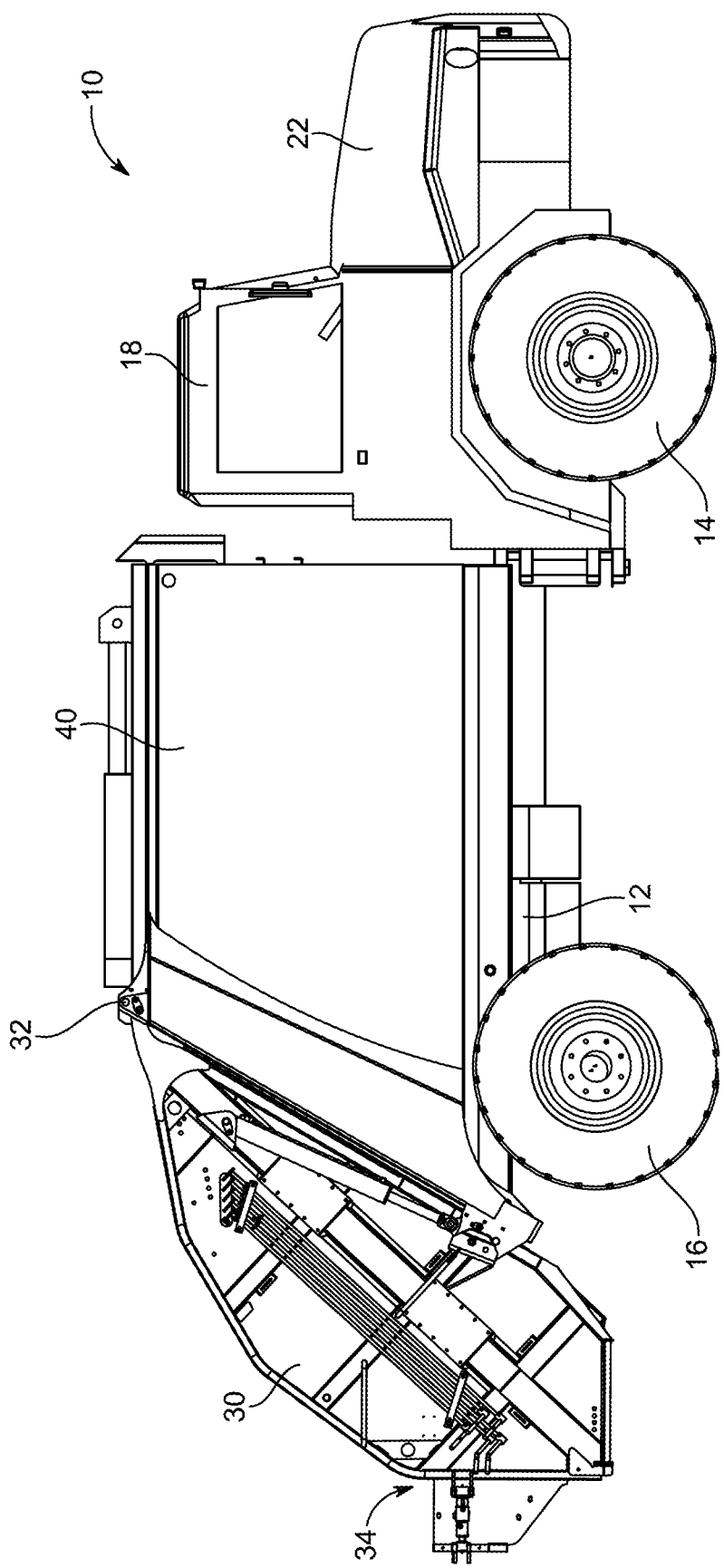
FIG. 1 shows a side view of a rear loader refuse collection vehicle.

Turning now to FIG. 1, one example of a rear loader refuse collection vehicle 10 is illustrated. In this embodiment, rear loader refuse collection vehicle 10 is shown having a truck frame 12 supported by a pair of front wheels 14, and a set of rear wheels 16. Frame 12 also supports a cab 18 designed to contain several operator controls (not shown). As will also be recognized, a motor or engine (not shown) is housed under a front hood 22 and is configured to supply necessary power to the vehicle and many other systems carried by the vehicle. Further components which will be clearly understood but are not specifically illustrated, typically include a transmission, hydraulic pumps, an electrical power supply, hydraulic power systems (pumps, tubes, valves, etc.), and other operating components. Those skilled in the art will recognize the need and general operation of these components.

Also illustrated in FIG. 1, frame 12 supports and carries a collection mechanism 30 and a main collection body 40 which is designed to define a main collection compartment 42. As appreciated, collection mechanism 30 will include a collection hopper or collection area 34 which is designed and configured to easily allow operators to deposit refuse therein. Lifting mechanisms (not shown) may also be included.

In operation, a sweep and scoop mechanism (not shown) is also typically used to pull refuse from the collection hopper 34 into main collection compartment 42. In addition, compaction equipment is included within main collection compartment 42 so refuse can be compacted as collection operations occur, thereby more efficiently utilizing the space in main collection compartment 42. Further, collection mechanism 30 is hingably mounted to main collection body 40 at an upper hinge point 32. Based upon this connection methodology, the collection mechanism 30 can be swung upward and out of the way, thus allowing main collection compartment 42 to be easily emptied when full. In this manner, collection mechanism 30 operates as a rear tailgate (also referred to herein as rear tailgate 30), and opening, closing and locking of collection mechanism 30 are further discussed below.

Figure 2:
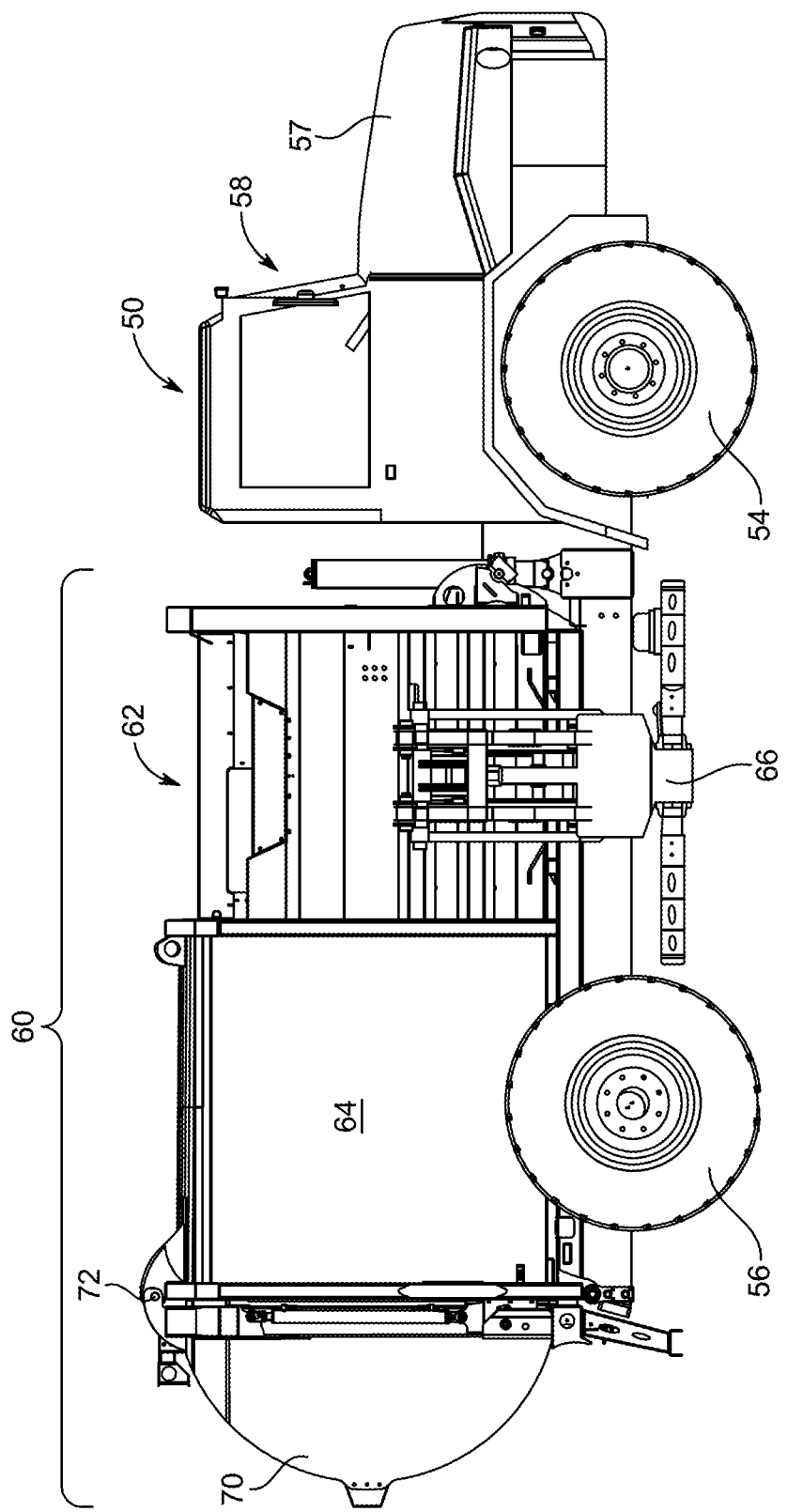
FIG. 2 illustrates an exemplary side loader refuse collection vehicle.

Turning now to FIG. 2, a version of a side load refuse collection vehicle 50 is generally illustrated. Similar to rear loader collection vehicle 10, side load refuse collection vehicle 50 includes a cab 58 which is mounted to a frame (not shown). A front wheel 54, and a pair of rear wheels 56 are illustrated, which accommodate the movement of side loader refuse truck 50. A front hood 57 is utilized to house an engine (not shown) as is well understood and recognized.

A side loader collection system 60 is generally illustrated at the rear portion of side loader collection vehicle 50. As shown, side load collection system 60 generally includes a collection hopper 62, and a main collection body 64. A grabber arm 66 is positioned on one side of the refuse collection mechanism 60, and is generally configured to grab refuse containers and dump their contents into collection hopper 62. At a rear portion of side loader collection system 60 a tailgate 70 is utilized to enclose the back portion of main collection body 64. Tailgate 70 is generally hinged at an upper hinge point 72, and will be lifted upwardly to open the main collection body and allow refuse to be ejected from a rear portion of the side load collection system 60. Further details of this tailgate and its operation are discussed below.

Although not illustrated in any of the figures, it will generally be understood that a front loader refuse collection vehicle will operate somewhat similarly to the side loader refuse collection vehicle 50 illustrated in FIG. 2. A front loader refuse collection vehicle will have a similar collection hopper, and a main collection body which are positioned behind the collection hopper. The primary difference being that a front loader mechanism will retrieve refuse containers positioned at front portion of the vehicle, and then lift them to the collection hopper by moving the container over the cab. With that said, the main collection body, and rear tailgate of a front loader collection vehicle are very similar to those structures discussed above in relation to side loader refuse collection vehicle 50.

As generally discussed above, the various configurations of existing refuse collection vehicles include a tailgate of some type. As mentioned, in the rear loader refuse collection vehicle 10, the collection hopper and other mechanisms effectively form a tailgate, while also providing additional features. In the side loader 50 and front loader refuse collection vehicles, the tailgate will typically not include additional features.

Figure 3B:
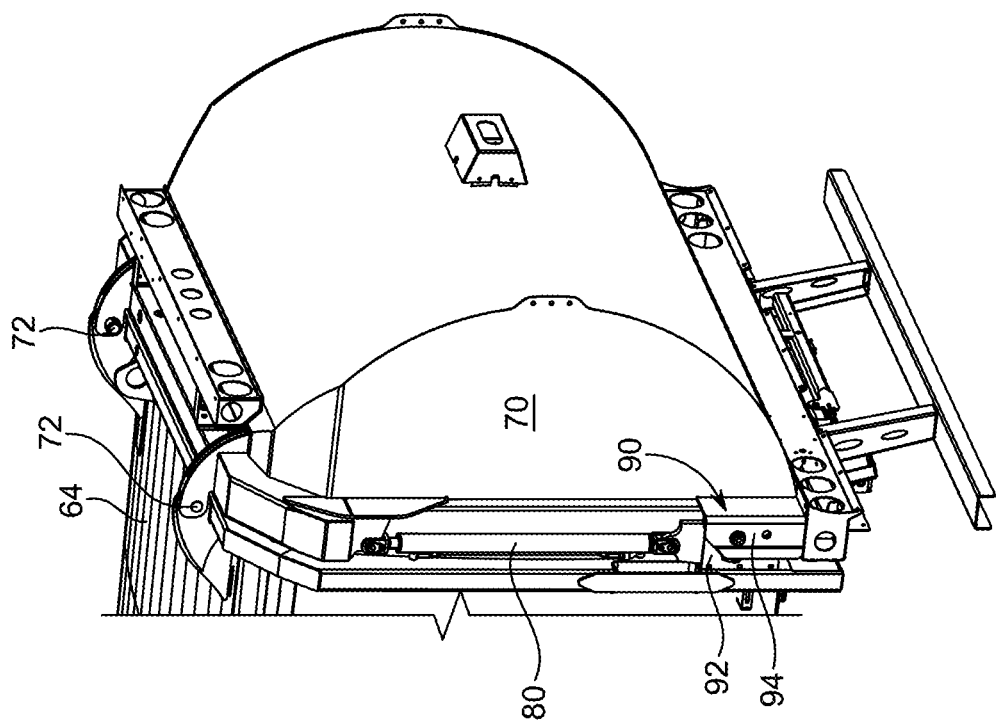
FIG. 3 shows a rear portion of a side loader refuse collection truck, with FIG. 3A showing the tailgate in a partially open position, and FIG. 3B showing the tailgate in a locked position.
Figure 3A:
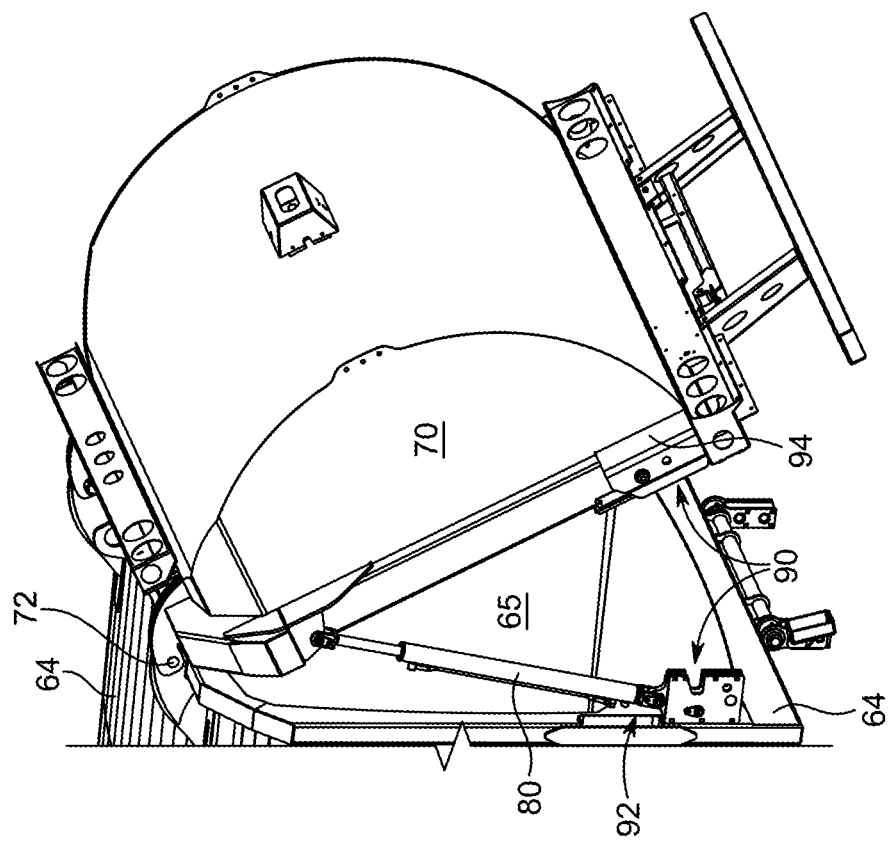

Referring now to FIGS. 3A and B, a partial rear view of the slide loader refuse collection vehicle 50, generally illustrated in FIG. 2. As can be seen, FIG. 3A illustrates tailgate 70 in a partially open position, and FIG. 3B illustrates the tailgate 70 in a closed/locked position. In FIG. 3A, an interior portion of 65 of main collection body 64 is also visible. As illustrated in these figures, tailgate 70 will hinge about a tailgate hinge 72 located at an upper portion of main collection body 64.

Figure 4B:
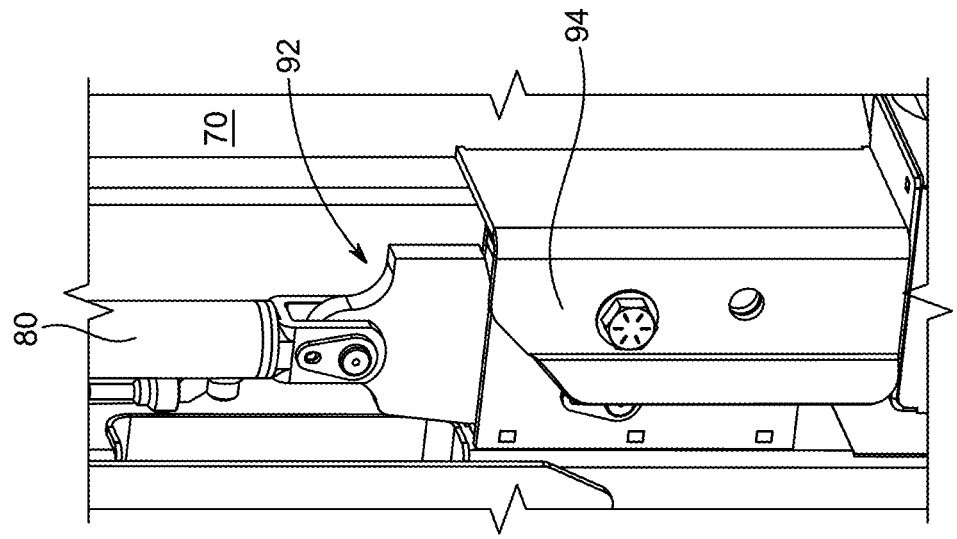
FIG. 4 presents a close-up view of the lock assembly coupled to the main body and the tailgate, with FIG. 4A showing the lock assembly in an open/un-locked configuration, and FIG. 4B showing the lock assembly in a closed/locked position.
Figure 4A:
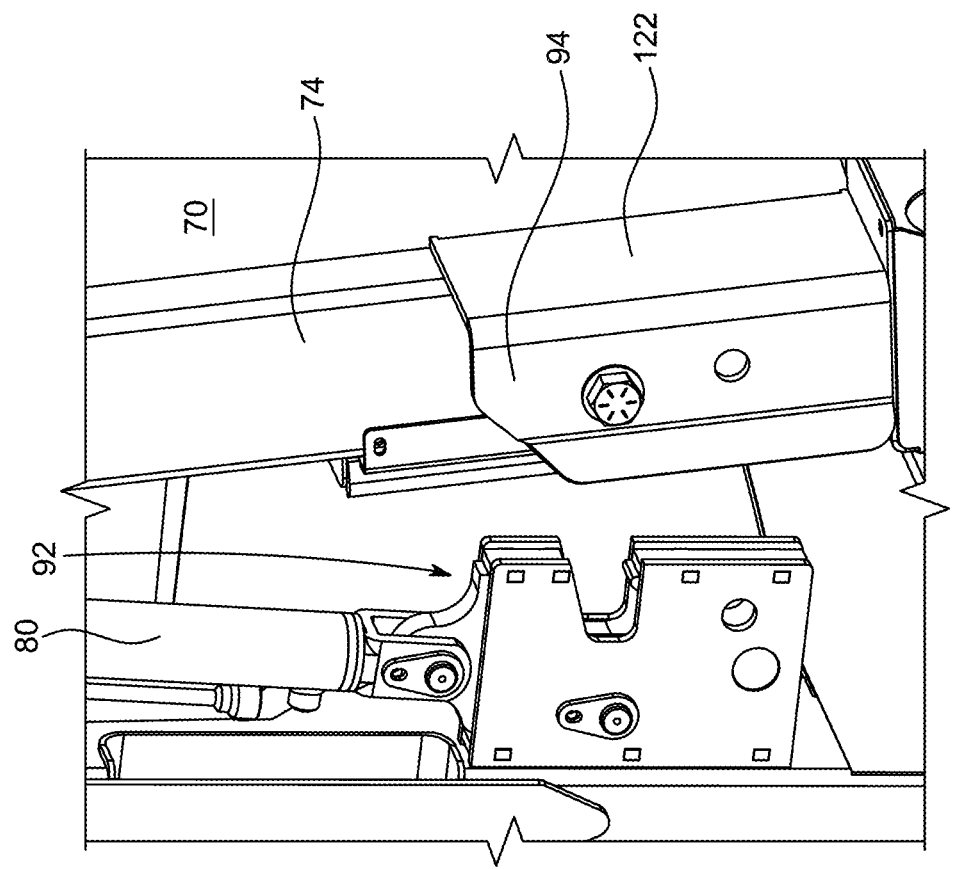
Figure 6B:
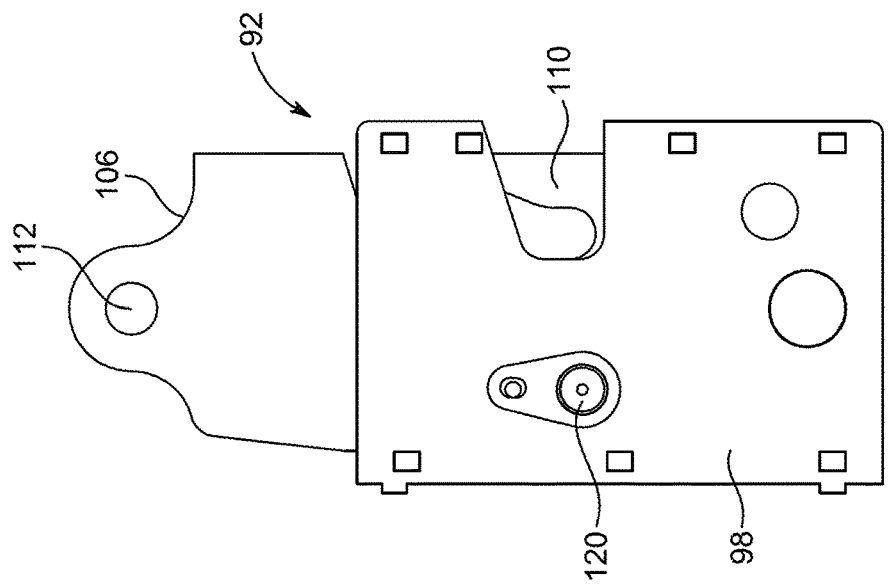
FIG. 6B shows the locked position.
Figure 6A:
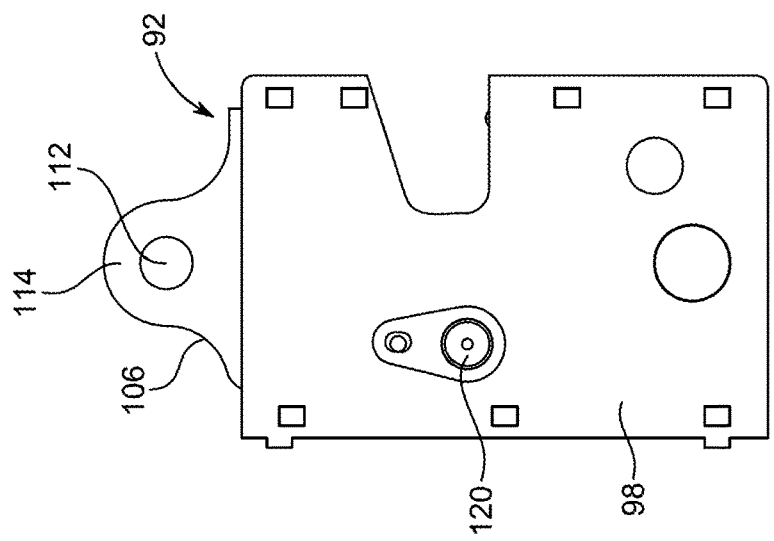

Also illustrated in FIGS. 3A and 3B are a hydraulic cylinder 80 and a lock assembly 90. As will be further discussed below, lock assembly 90 is generally made up of a lock mechanism 92 and a clevis 94. In this particular embodiment, lock mechanism 92 is coupled to collection body 64, and clevis 94 is coupled to tailgate 70. FIGS. 4A and 4B show a close-up view of lock mechanism 90, with FIG. 4A illustrating the configuration were tailgate 70 is partially open and lock mechanism 92 is in the open/unlocked position. Similarly, FIG. 4B shows tailgate 70 in a closed/locked position, with clevis 94 partially surrounding lock mechanism 92, and lock mechanism 92 in a locked position. Further details regarding these mechanisms are outlined below.

Figure 5:
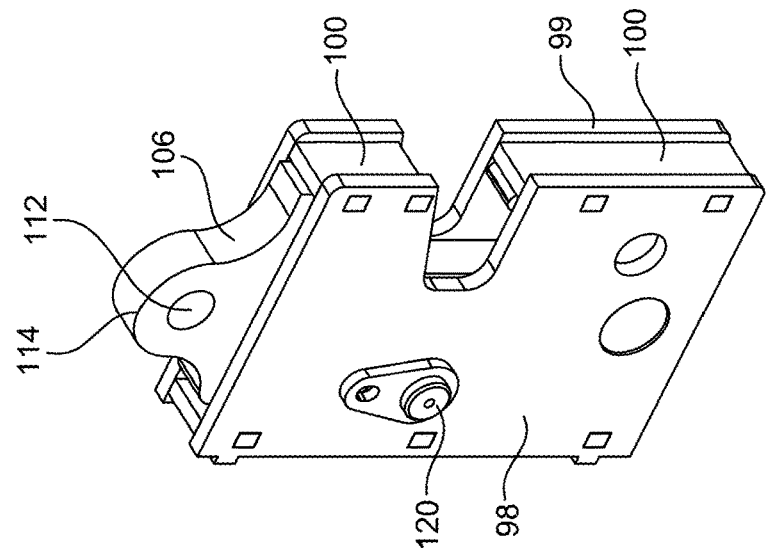
FIG. 5 is a perspective view of the lock mechanism shown in FIGS. 3 and 4 above.
Figure 7:
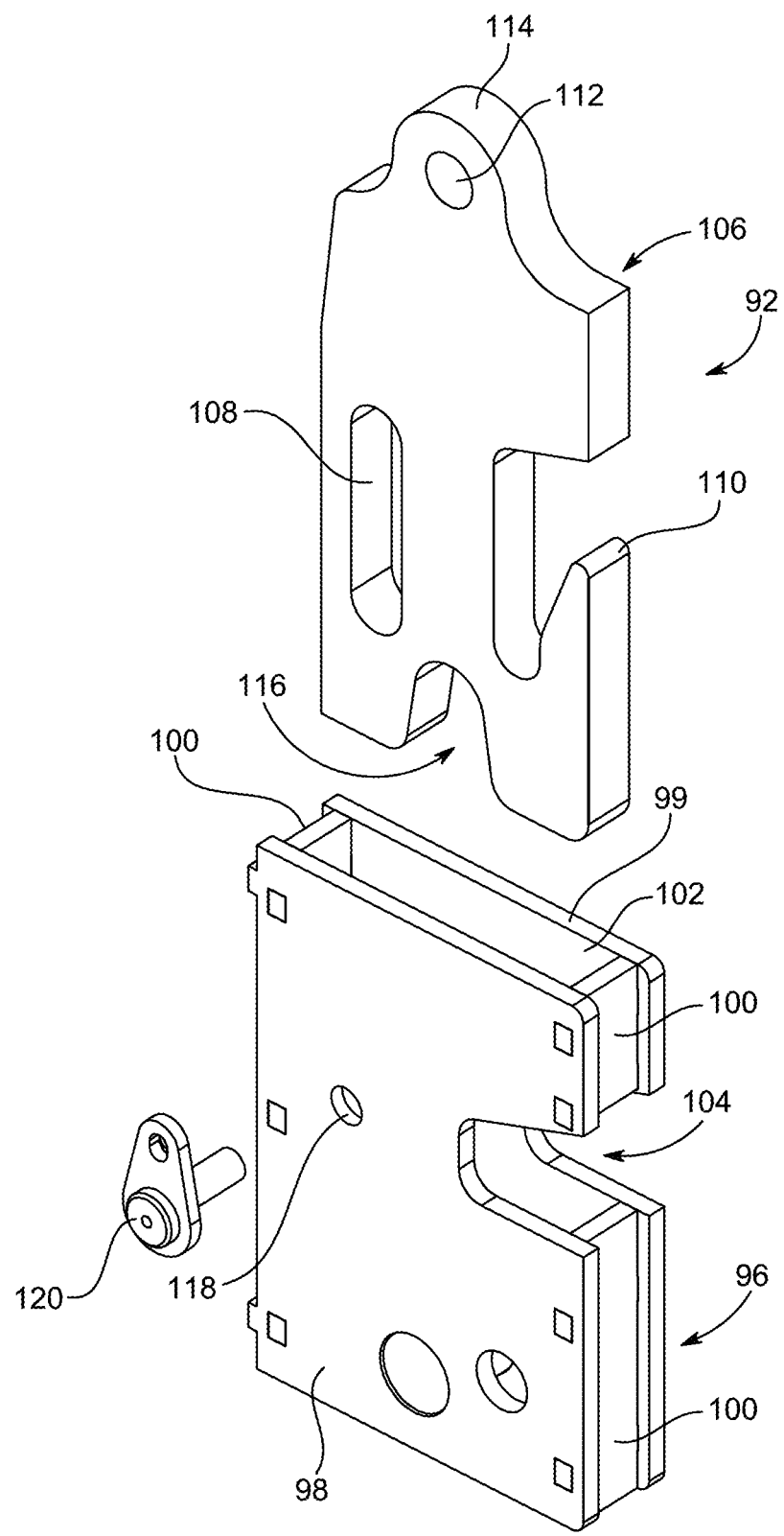
FIG. 7 presents a perspective and exploded view of the locked mechanism making up the lock assembly.

Turning now to FIG. 5, a perspective view of lock mechanism 92 is generally illustrated. Similarly, FIG. 7 presents an exploited view of lock mechanism 92 and better illustrates the components thereof. More specifically, lock mechanism 92 generally includes a guideblock 96, which is configured with a first side wall 98 and a second sidewall 99, along with a number of spacer plates 100, These components are formed to create an opening 102 configured to accommodate and receive a lock plate 106. At one side thereof, guideblock 96 includes a lock notch 104 formed by openings or notches in both first sidewall 98 and second sidewall 99.

As suggested above, lock plate 106 is configured to be received and movable within opening 102 of guideblock 96. In this embodiment, lock plate 106 is a generally planar plate-like structure having a containment slot 108 therein, a locking hook 110 on one side, a coupling opening 112 positioned in a upward extension 114, and a relief opening 116 at a bottom edge thereof. As will be further discussed below, relief opening 116 (or relief gap 116) will provide for alignment features. In addition to the components discussed above, lock mechanism 92 also includes a capture pin 120 which is configured to be received within a capture opening 118 (positioned within first side wall 98 and second side wall of 99). When assembled, capture pin 120 will also be contained within containment slot 108 of lock plate 106. In this embodiment, lock plate 106 is thus allowed to move a predetermined distance, which is determined by the length of containment slot 108. As recognized, capture pin 120 will slide within containment slot 108. As will also be recognized, guideblock 96 will further limit the direction and travel of block plate 106.

Figure 8:
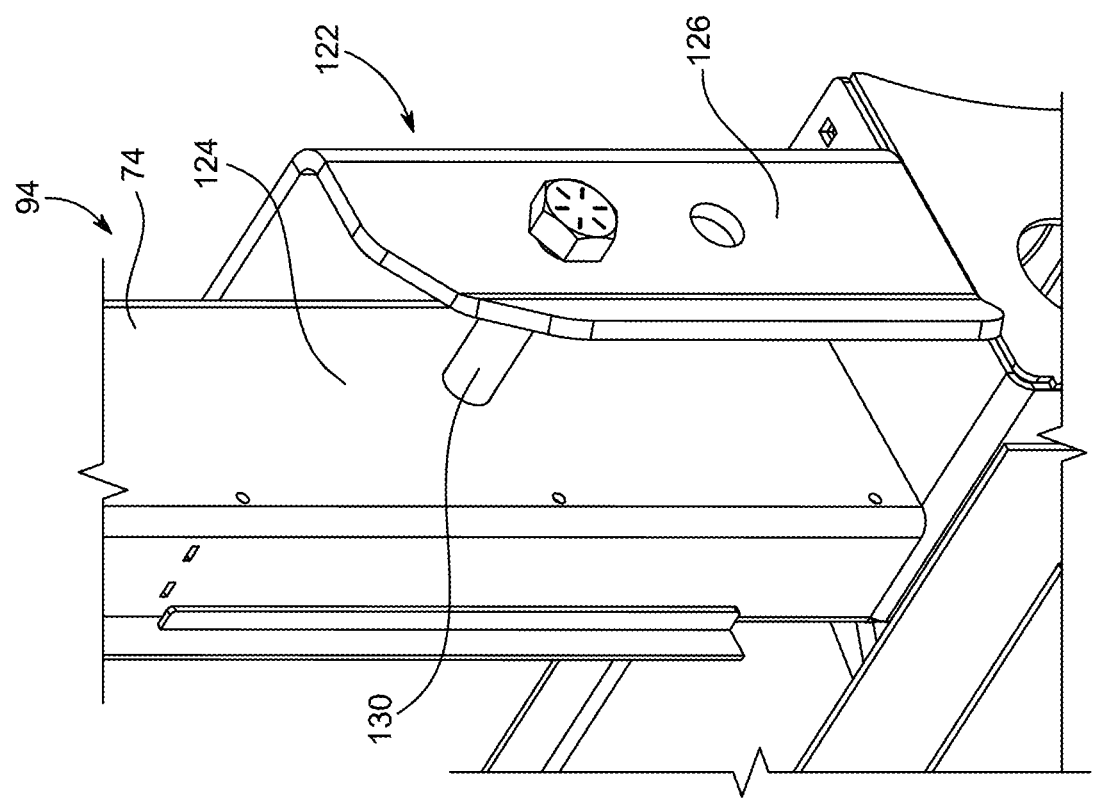
FIG. 8 illustrates a perspective view of the lock clevis which is included as a portion of the lock assembly.

Referring now specifically to FIG. 8, a more detailed view of clevis 94 is presented. In this embodiment, clevis 94 is formed from an open rectangular plate 122 which is attached to a sidewall portion 74 of tailgate 70. Open rectangular plate 122 is bent at an approximate 90 degree angle to create a gap 124 between an outer flange member 126 and sidewall portion 74. A locking pin 130 is attached and coupled between outer sidewall 126 and tailgate sidewall portion 74 in a manner that creates a separation from those components. As will be appreciated, clevis 94 is configured in a manner to surround lock mechanism 92 when tailgate 70 is moved to a closed position. In addition, locking pin 130 is aligned to be positioned within lock notch 104 of guideblock 96 when tailgate 70 is in this closed position. Again, FIGS. 3B and 4B illustrate this orientation wherein clevis 94 will surround a portion of lock mechanism 92.

Turning now to FIGS. 9A and 9B, a partial sectional sideview of lock assembly 90 is presented, with FIG. 9A illustrating the relative positions of lock mechanism 92 and clevis 94 when the tailgate is partially open. In these figures, the position of lock plate 106 is partially illustrated in dashed lines, showing its position in both the locked and unlocked positions. As can be seen, locking hook 110 will capture and completely surround lock pin 130, when lock plate 106 is in its locked position (see FIG. 9B). In this particular embodiment, locking pin 130 is specifically designed to be movably connected as part of clevis 94, thus allowing the shaft of locking pin 130 to rotate. In this manner, as locking plate 106 has moved from its unlocked to locked position, locking hook 110 will catch and capture locking pin 130. Locking pin 130 will slide further into locking hook 110, thus pulling tailgate 70 inwardly. This configuration allows for the tight closing of tailgate and a positive locking, ensuring that tailgate 70 will not spring open as long as lockplate 106 is held in the locked position.

Figure 10B:
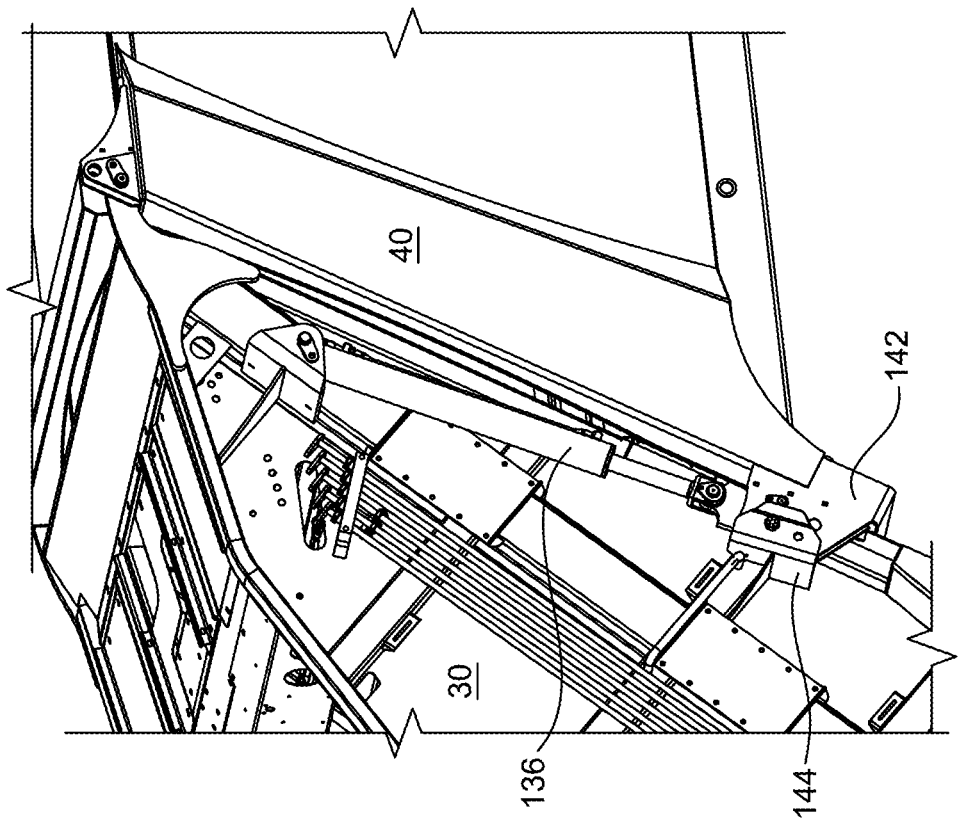
FIG. 10B illustrates the tailgate in a locked position.
Figure 10A:
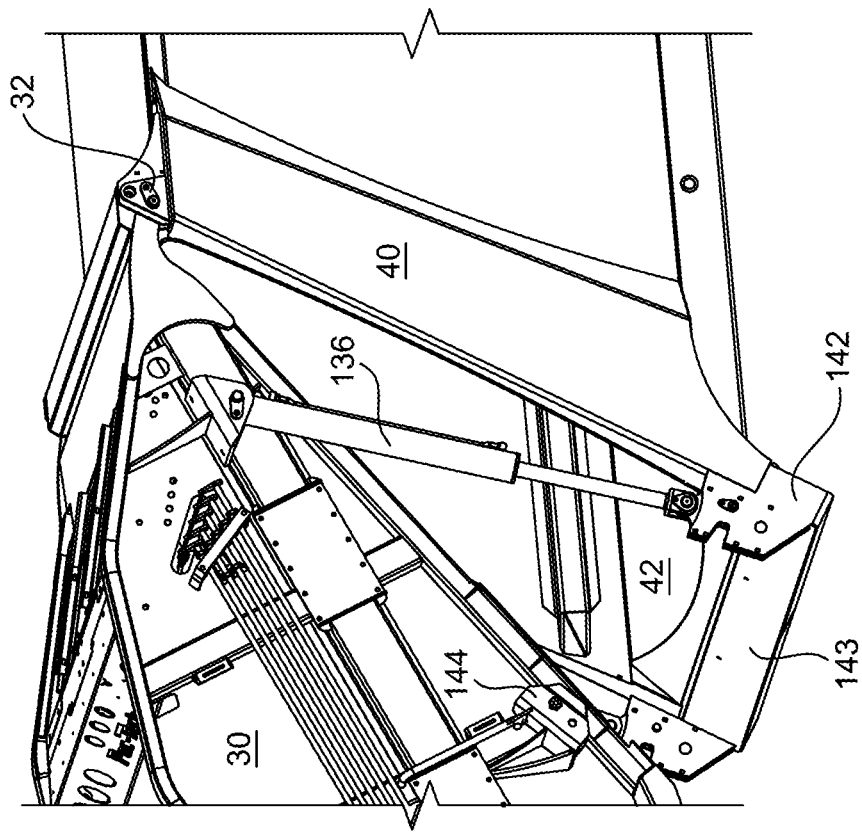
Figure 11B:
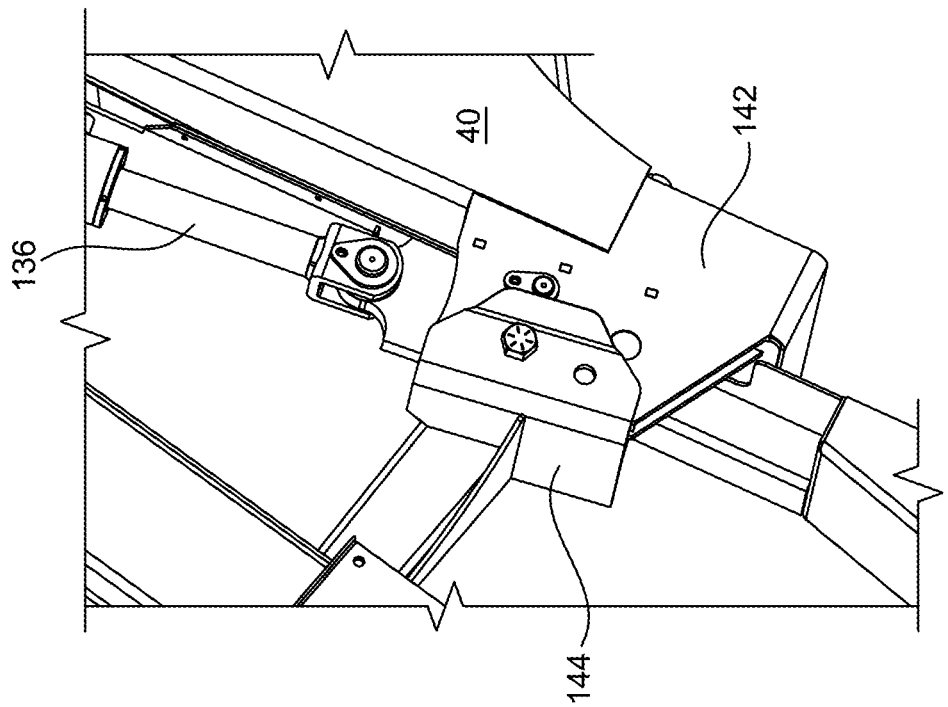
FIG. 11 shows a close-up view of the lock assembly utilized with the rear loader refuse collection vehicle illustrated in FIG. 10, with FIG. 11A showing the lock assembly in the open position and FIG. 11B showing the lock assembly in the closed position.
Figure 11A:
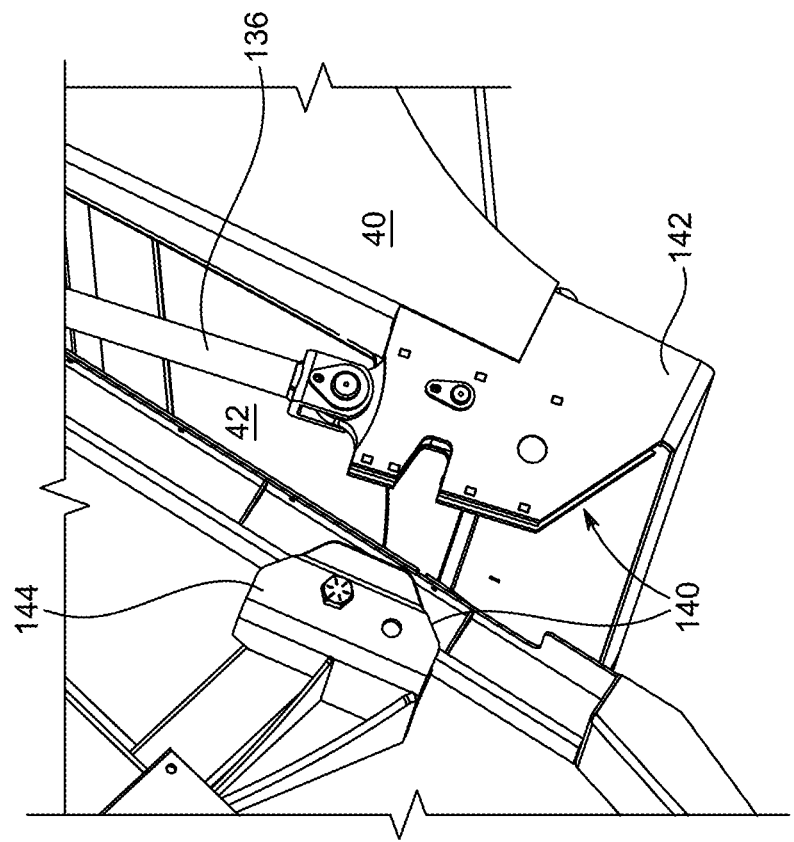
Figure 12:
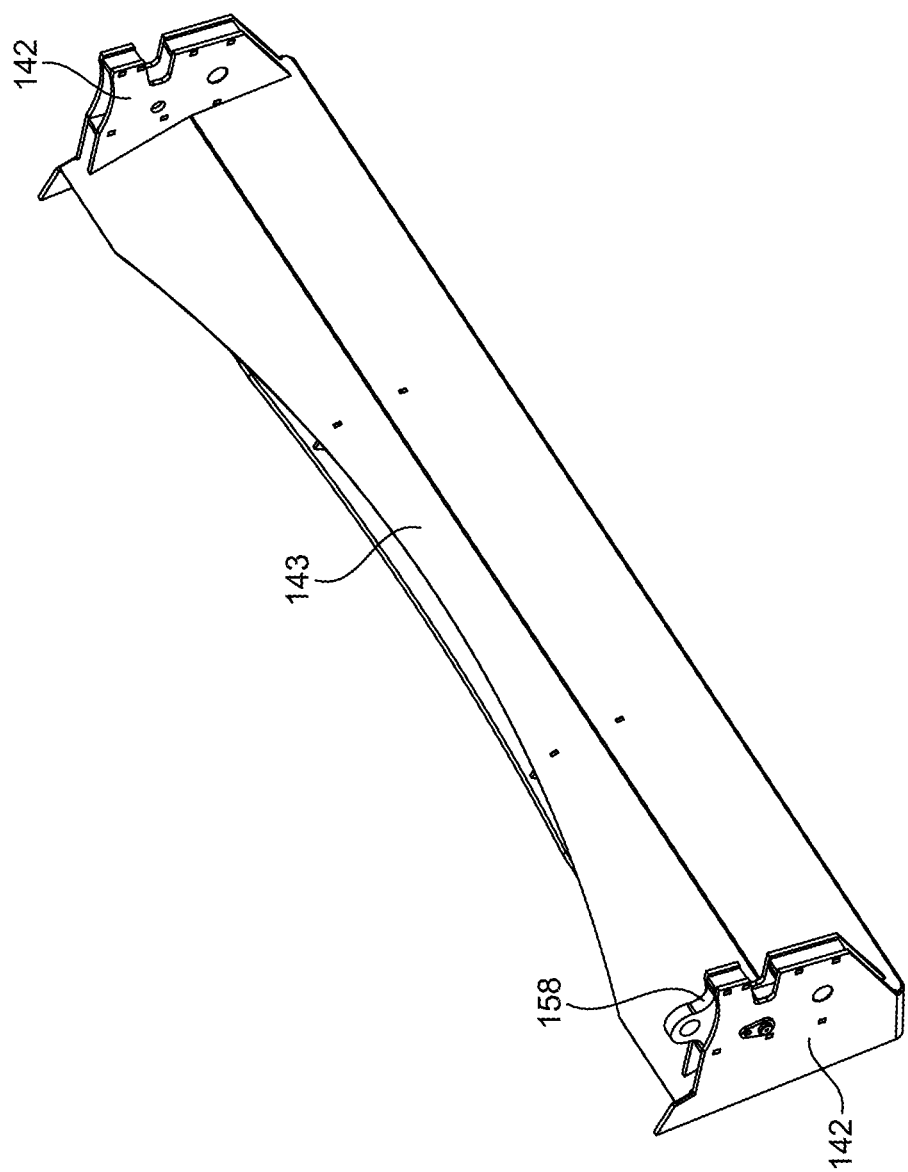
FIG. 12 is a perspective view of the lock mechanism utilized with a rear loader refuse collection vehicle.

Turing now to FIGS. 10 and 11, an alternative lock assembly 140 is generally illustrated. More specifically, lock assembly 140 in this embodiment is uniquely configured to be utilized with a rear loader refuse collection vehicle. As generally discussed above, rear loader refuse collection vehicles typically include a collection hopper, along with a slide and sweep mechanism which is utilized to collect and transfer refuse as its collected. As shown in FIG. 10A and 10B, a portion of a main collection body 40 is generally illustrated, and a portion of main collection compartment 42 can be seen in FIGS. 10A and 11A. Again, collection mechanism 30 is coupled to main collection body 40 at an upper hinge point 32. In this embodiment, collection mechanism 30 operates as a tailgate providing limited access to a main collection compartment when appropriate.

Again, lock assembly 140 is utilized to positively lock collection mechanism 30 when desired. Lock assembly 140 includes a lock mechanism 142 and a clevis structure 144 which are configured to operate in a similar manner to lock assembly 90 discussed above. A hydraulic cylinder 136 is similarly utilized to raise and lower collection mechanism 30 but is also configured to cooperate with lock assembly 140 to provide the desired locking functions. In this particular embodiment, a first locking mechanism 142 and a second locking mechanism 142 are positioned and configured to be on opposite ends of a rear frame section 143 of a refuse collection vehicle 10. It will be understood that first locking mechanism 142 and second locking mechanism 142 are virtually identical, and operate in a similar manner to achieve the desired locking functions. In this embodiment, first locking mechanism 142, second locking mechanism 142 and rear frame section 143 are configured to be a separate component, but many variations are possible.

Figure 14:
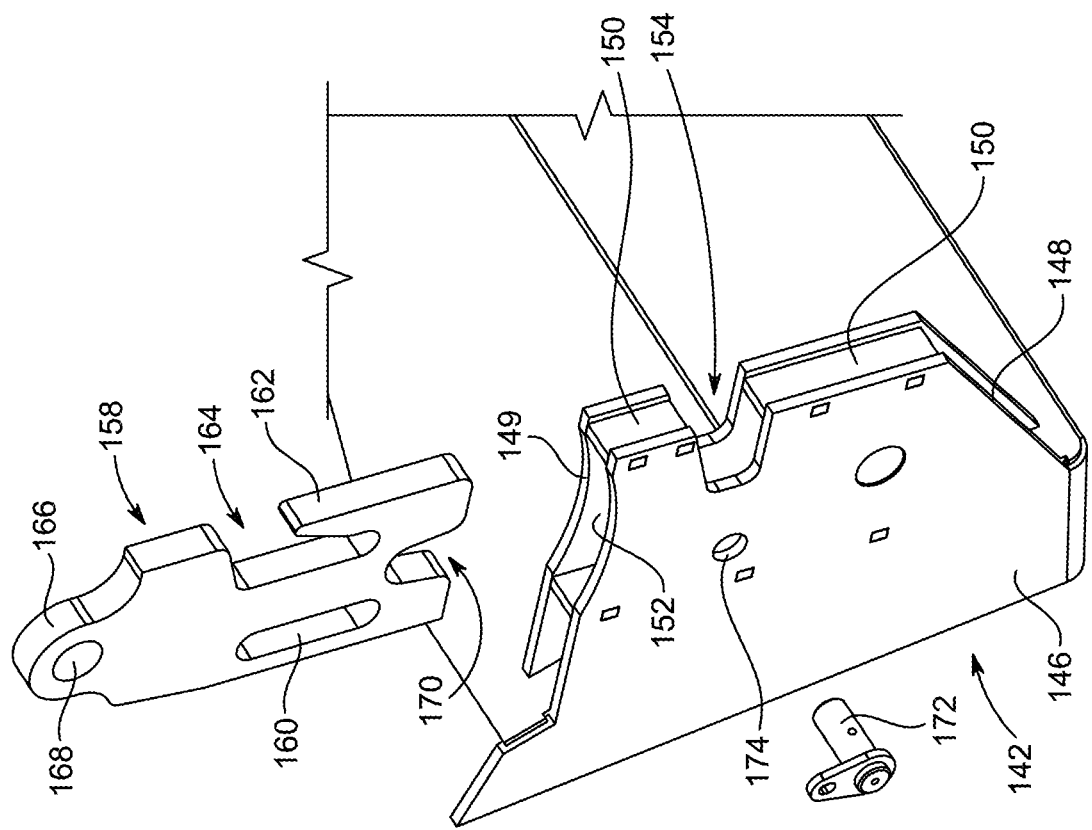
FIG. 14 presents an exploded view of the lock mechanism coupled to a portion of the refuse collection vehicle.

Turning now to FIG. 14, an exploded view of first locking mechanism of 142 is presented. As illustrated, locking mechanism 142 includes a guideblock 146 which has a first sidewall 148 and a second sidewall 149, along with a number of spacer plates 150, all configured to create an inner guide slot 152. As will be recognized, guide slot 152 or guide opening 152 will be specifically configured to cooperate with lock plate 158. Guidelock block 146 is further configured to have a side notch or opening 154 positioned at one side thereof, which is also open to internal opening or guide slot 152. Lock notch or lock opening 154, will be specifically configured to cooperate with other components, as discussed in further detail below.

In a manner similar to the previously discussed lock plate, lock plate 158 includes a containment slot 160 and a locking hook 162 which is positioned immediately adjacent a lock opening 164. A coupling extension 166 exists at an upper position of lock plate 158, and is configured to support a coupling open 168. A relief opening 170 is also situated at a lower portion of lock plate 158, which is configured to provide clearance and cooperate with sensors as will be discussed below in more detail.

Lock mechanism 142 also includes a containment pin 172, which is configured to be inserted into an opening 174 in first sidewall 148 and second sidewall 149. Containment pin 172 will also cooperate with containment slot 160 to control movement of lock plate 158.

Again, lock assembly 140 also includes lock clevis 144 which in this embodiment is designed to be coupled to collection mechanism 30. In a manner similar to clevis 94 discussed above in relation to other embodiments, clevis 144 includes a uniquely configured coupling plate 176, which is configured to be coupled to an appropriate portion of refuse collection mechanism 30. Again, clevis 144 is configured to create a gap 178 between plate number 176 and the related portion of refuse collection mechanism 30. A locking pin 180 is coupled to both collection mechanism 30 and bracket 176, in a manner to span a portion of opening 178. Again, pin 180 is uniquely configured to be partially rotatable in this particular embodiment, thus providing certain advantages which are further discussed below.

Figure 13A:
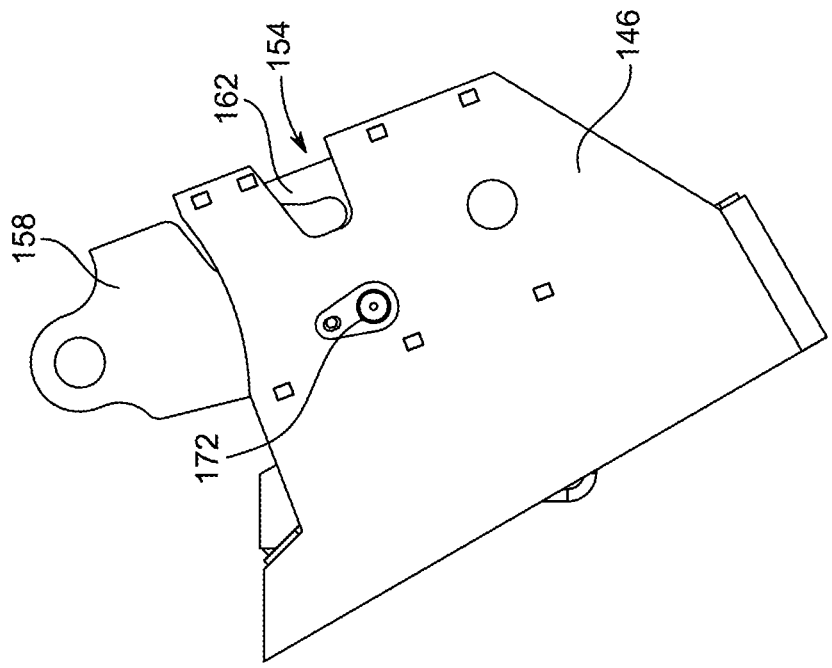
Figure 13B:
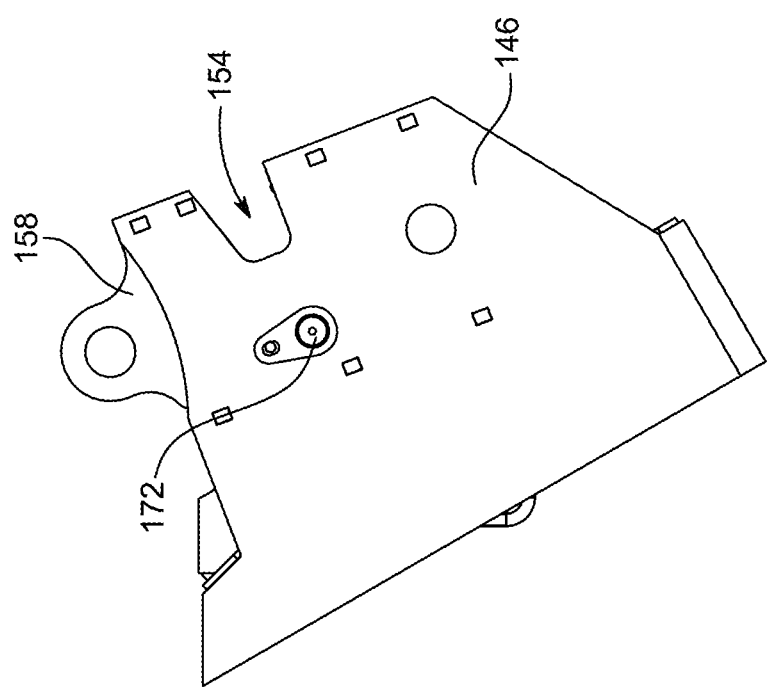
FIG. 13B shows the lock mechanism in the closed/locked position.
Figure 15:
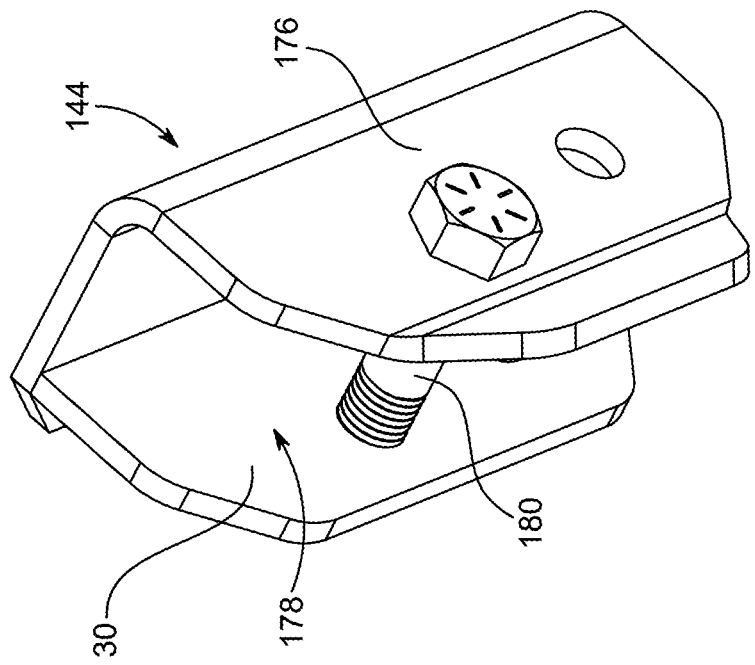
FIG. 15 illustrates a locked clevis cooperating with the locked mechanism of FIG. 13.
Figure 16A:
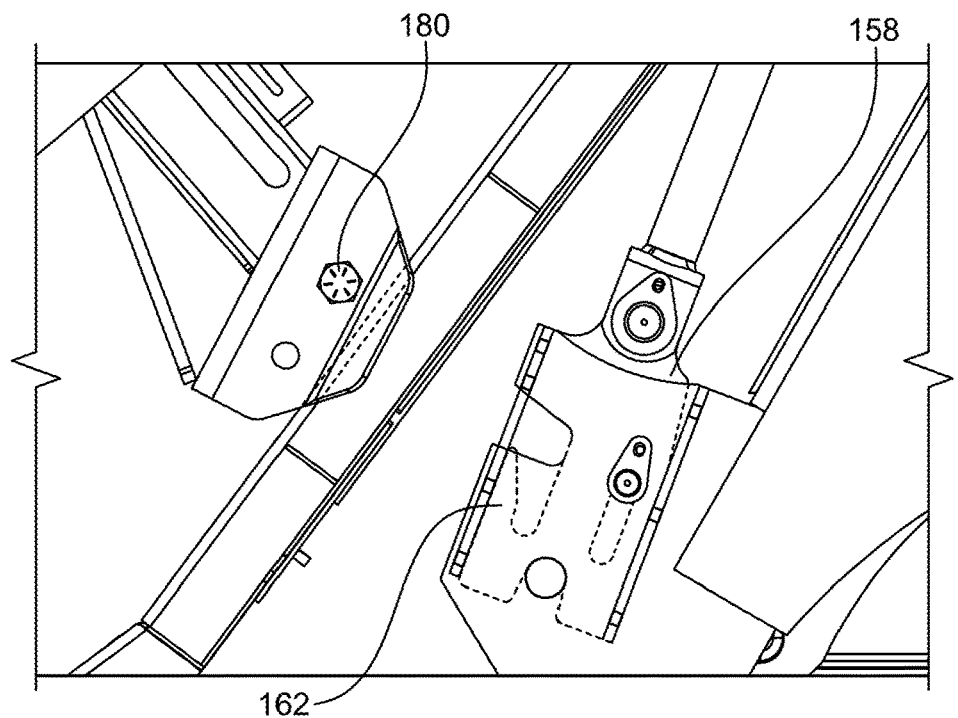
FIGS. 16A and 16B show the lock assembly of FIGS. 10 and 11, better presenting the position of elements in the unlocked and locked position.
Figure 16B:
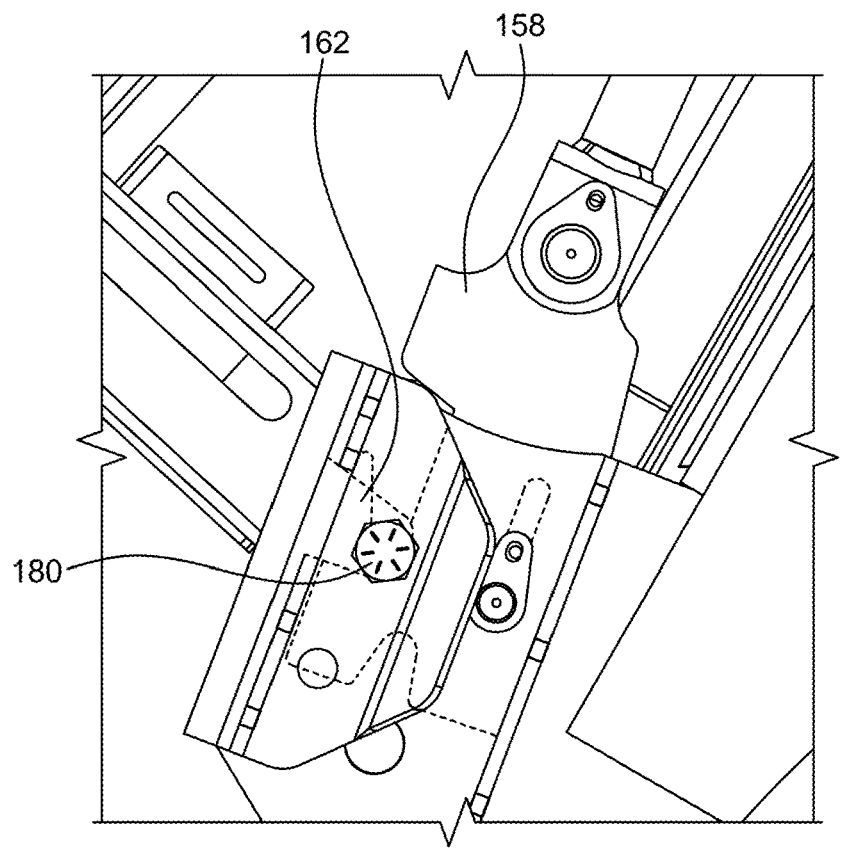

Again, lock mechanism 142 is further illustrated in FIGS. 13A and 13B, where a sideview of guideblock 146 and lock plate 158 are generally illustrated. In FIG. 13A, guideblock 146 and lock plate 158 are illustrated in the open or unlocked position, wherein FIG. 13B illustrates these components in the locked position. As shown in FIG. 13B, locking hook 162 can be seen within a lock opening 154. FIGS. 16A and 16B again illustrate the configuration and positioning of all these components in a sectional view.

Turning now to FIGS. 17-23, various details regarding a front loader tailgate locking assembly 190 are illustrated. As shown in FIGS. 17A and 17B, a partial rear portion of a front loader refuse collection vehicle is illustrated. As specifically seen, a portion of collection body 182, that has containment housing or containment area 186 within, has a tailgate 184 attached thereto. To accommodate opening, tailgate 184 is connected to collection body 182 at hinge points 188 that are located on a top portion thereof. As is well recognized and appreciated, this structure allows tailgate 184 to be opened and closed to accommodate dumping or ejection or collected refuse.

Figure 17B:
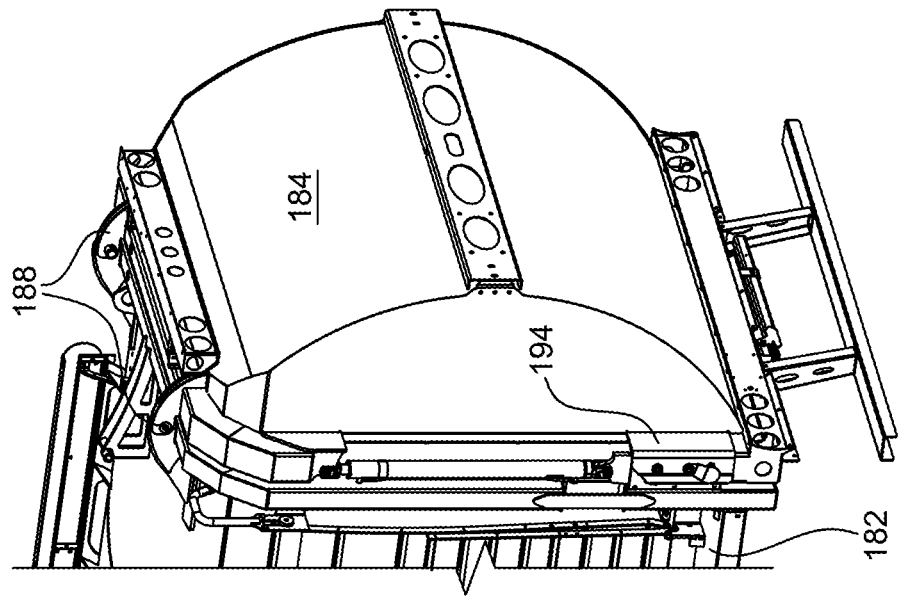
FIG. 17B shows the tailgate in the closed/locked position.
Figure 17A:
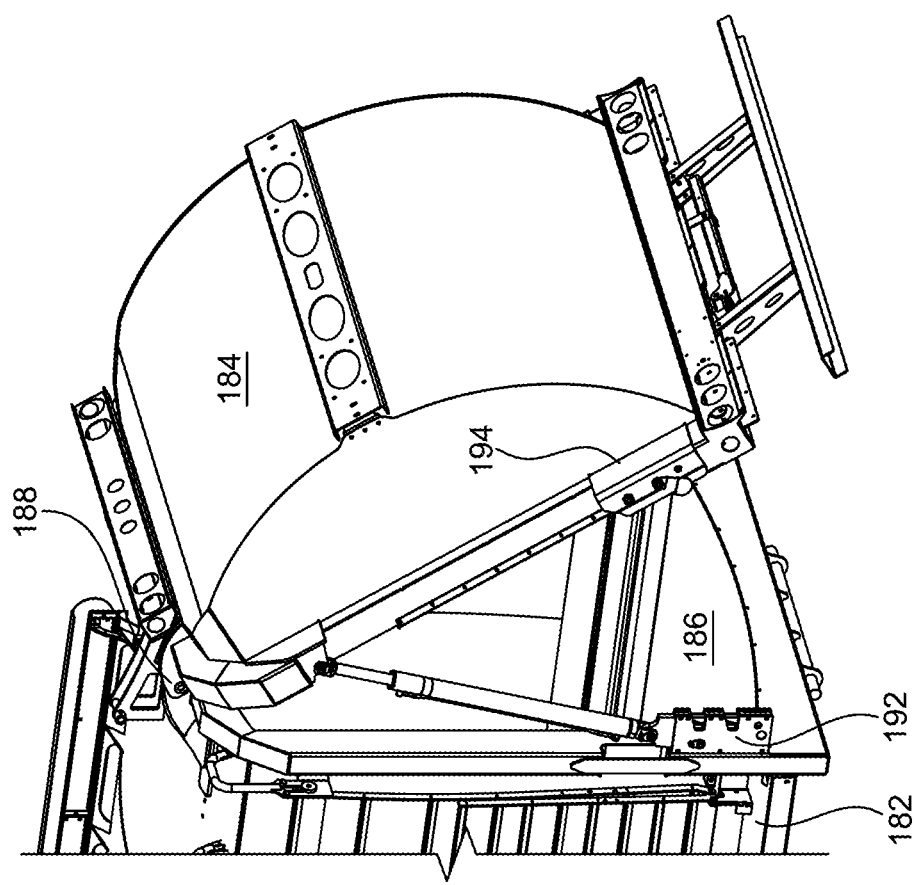
Figure 18B:
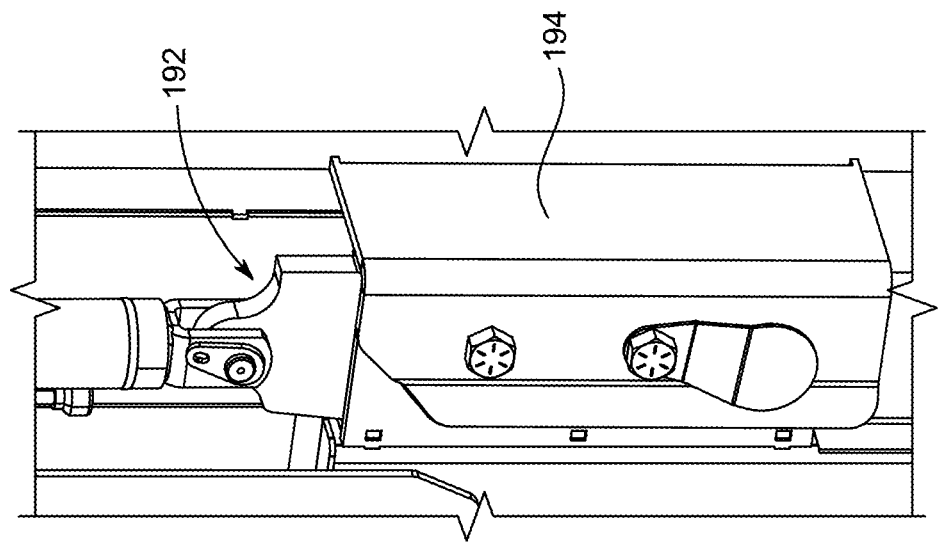
FIG. 18 presents a close up view of the locked assembly utilized in the front loader refuse collection vehicle, with FIG. 18A illustrating the lock assembly in the open position, and FIG. 18B illustrating lock assembly in the closed/locked position.
Figure 18A:
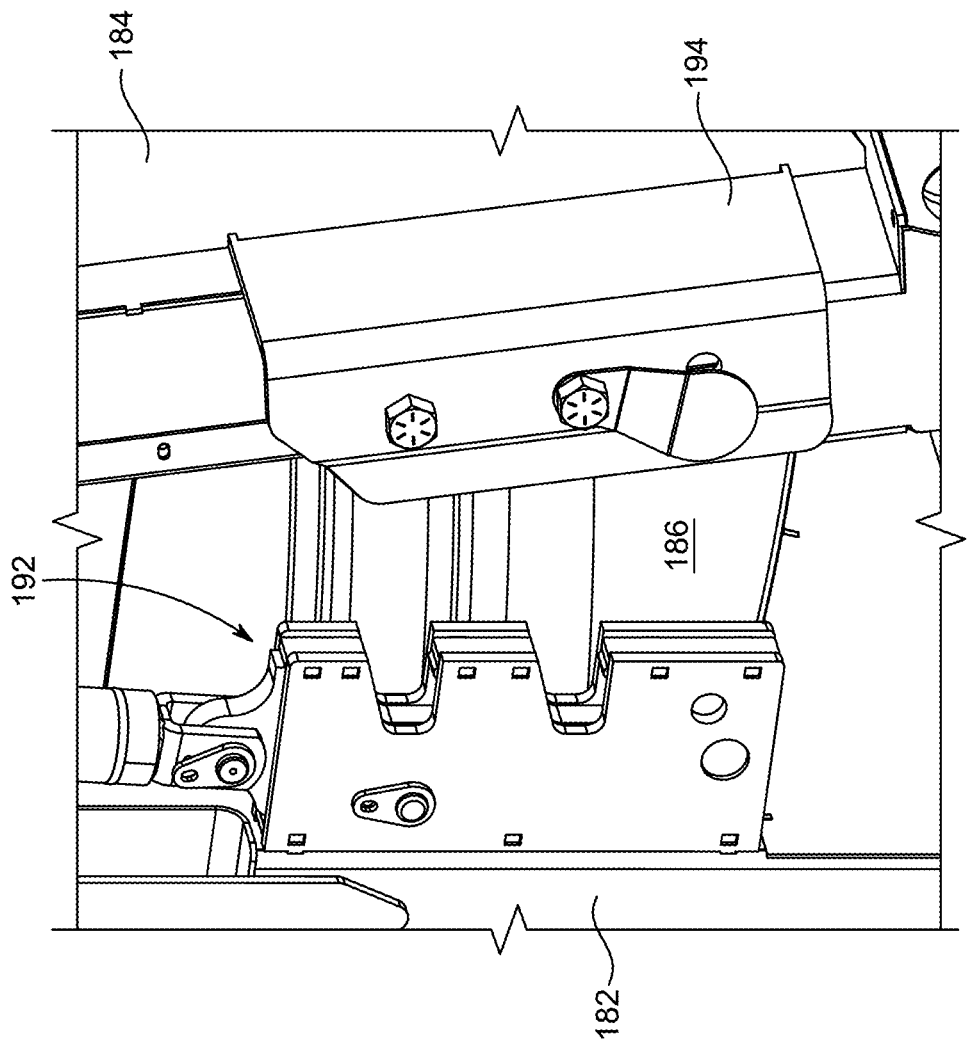

As in the embodiments discussed above, locking assembly 190 is utilized in conjunction with tailgate 184 and main collection body 182 to positively lock and contain tailgate 184 in a closed position when necessary. As can generally be seen in FIGS. 17A and 17B, lock assembly 190 includes a lock mechanism 192 a coupled to collection 182, along with a clevis 194 which is coupled to tailgate 184. FIGS. 18A and 18B illustrate these components in a more closeup manner. Clearly, FIGS. 17A and 18A illustrate a configuration with tailgate 184 partially opened, while FIGS. 17B and 18B illustrate tailgate 184 in its closed and locked position.

Figure 20B:
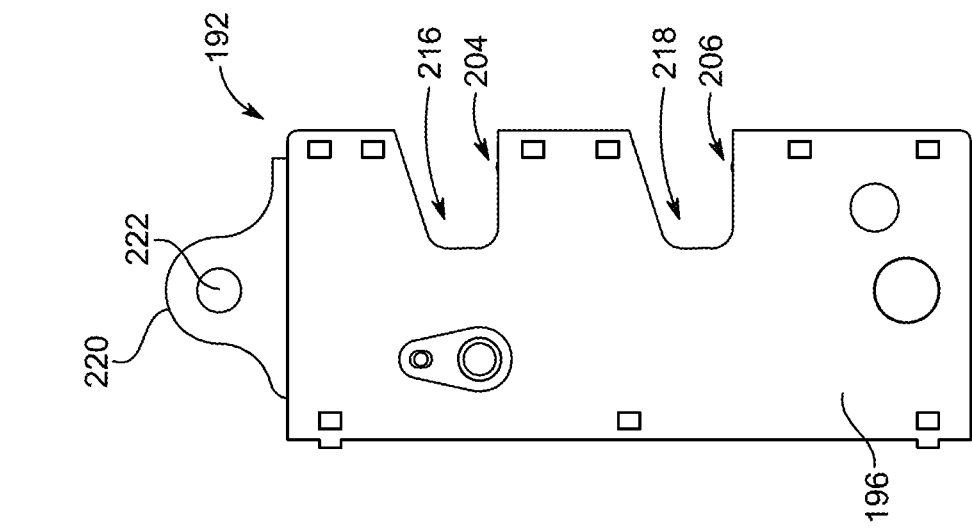
FIG. 20 shows a side view of the lock mechanism, with FIG. 20A showing the lock mechanism in an open position, and FIG. 20B showing the lock mechanism in a closed/locked position.
Figure 20A:
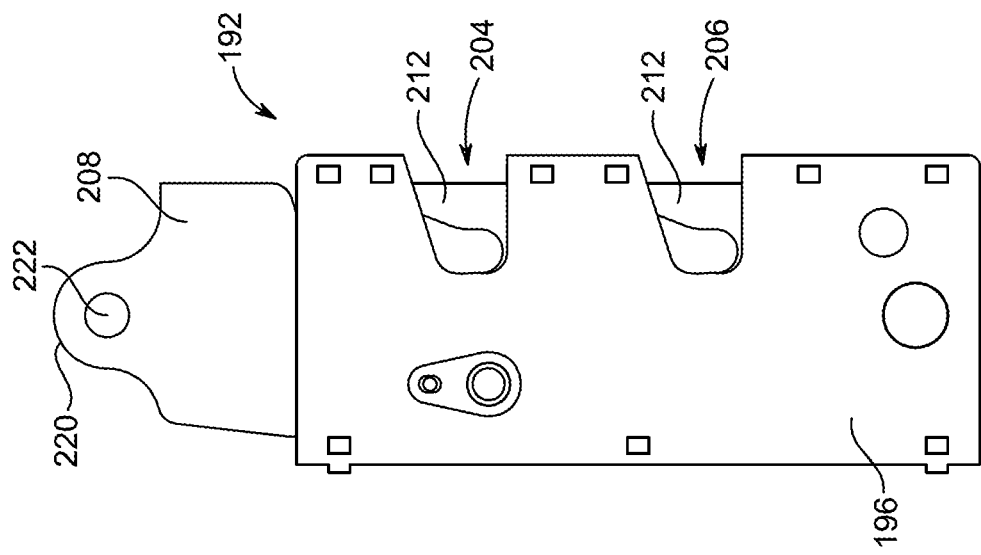
Figure 21:
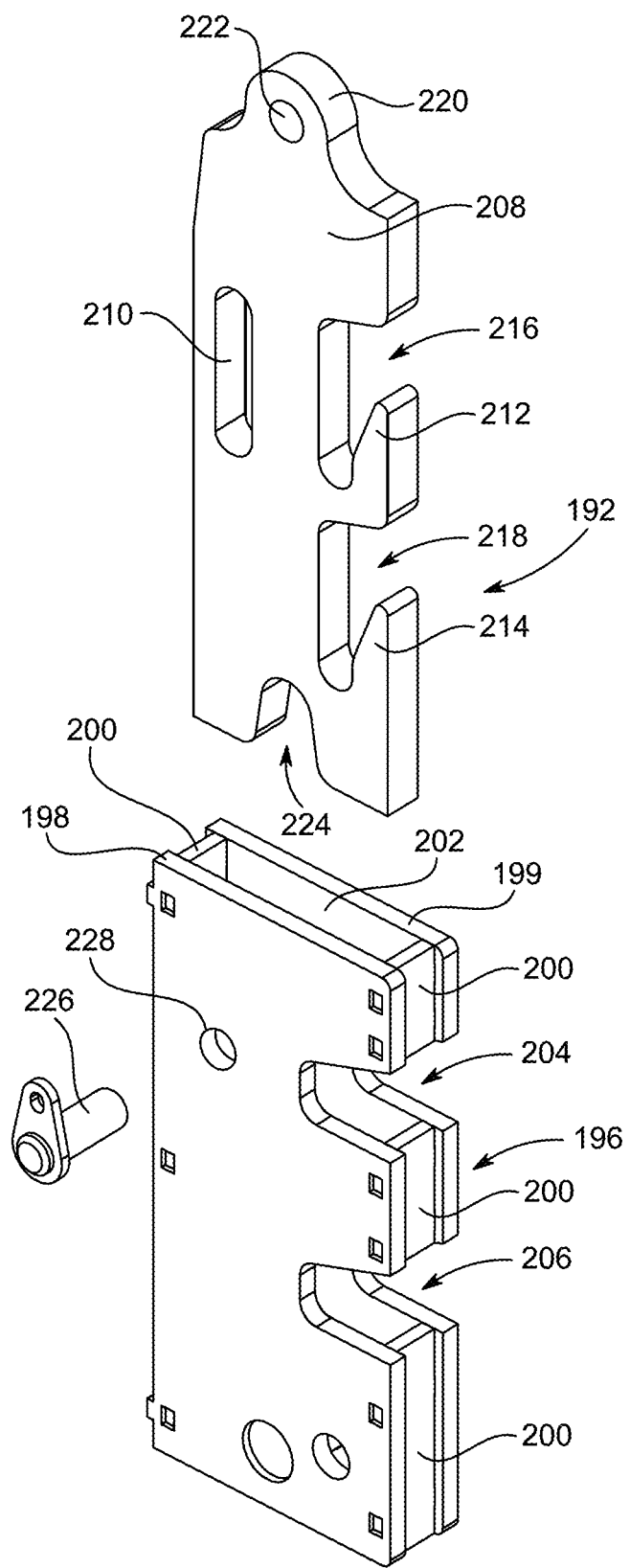
FIG. 21 provides an exploded view of the lock mechanism utilized in the front loaded refuse collection vehicle.

Further details and features of lock assembly 190 can be seen by referring to FIGS. 19-22. Turning now to FIG. 21, an exploded view of lock mechanism 192 is shown. As illustrated, lock mechanism 192 includes a guideblock 196 and a lock plate 208, which are configured to cooperate with one another to provide the necessary locking and unlocking features. Guideblock 196 is formed from a first sidewall 198 and a second sidewall 199, along with a number of spacers 200, which form an enclosed structure, having a slot opening 202 situated within guideblock 196. Located on one side of guideblock 196 a first lock opening or notch 204 and a second lock notch 206. As will be discussed below, these are uniquely configured and positioned to cooperate with several other components of lock assembly 190.

Lock mechanism 192 also includes lock plate 208, which is a generally plate like structure having a number of unique features therein. More specifically, a containment slot 210 exists within an interior portion of lock plate 208. Further, a first locking hook 212 and a second locking hook 214 are positioned on one side of lock plate 208, with a first lock opening 216 and a second lock opening 218 situated immediately adjacent thereto. At a top portion of lock plate 208, a coupling extension 220 exists, which has a coupling opening 222 situated therein. On a lower portion of lock plate 208, a relief opening 224 exists. Further details and purposes for these various features will be discussed in detail below.

Figure 19:
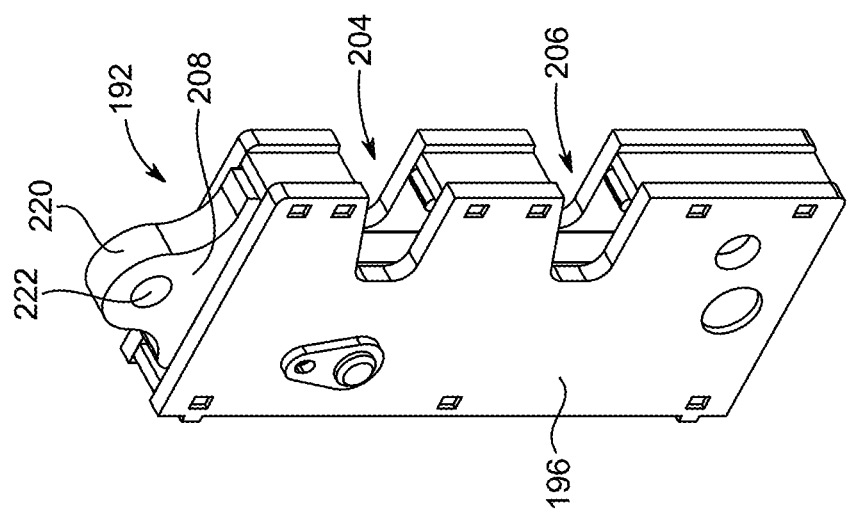
FIG. 19 presents a perspective view of the lock mechanism utilized in the front loader refuse collection vehicle.

Lock mechanism 192 also includes a containment pin 226 that is configured to be inserted into a containment opening 228, which is situated in first sidewall 198 and second sidewall 199. As will be appreciated, containment pin 226 will be also inserted into containment slot 210 in lock plate 208, when lock mechanism 182 is fully assembled. Fully assembled lock mechanism 192 is generally illustrated in FIG. 19 (a perspective view) and in FIGS. 20A and 20B (side views). Those skilled in the art will recognize that containment pin 226 and containment slot 210 are uniquely configured and positioned to control and limit the movement of lock plate 208 within guideblock 196.

Turning now to FIGS. 20A and 20B, lock mechanism 192 is shown in an open position or configuration (FIG. 20B) and a locked position or configuration (FIG. 20A). Containment slot 208 (not shown) and containment pin 226 will limit the movement of lock plate 208 between these two positions. As shown in FIG. 20B, when in the unlocked or open position, first lock opening 216 and second lock opening 218 of block plate 208 are aligned with first lock notch 204 and second lock notch 206 of guideblock 196. This will allow for guideblock 196 to align with a receive other components as further discussed below.

Figure 22:
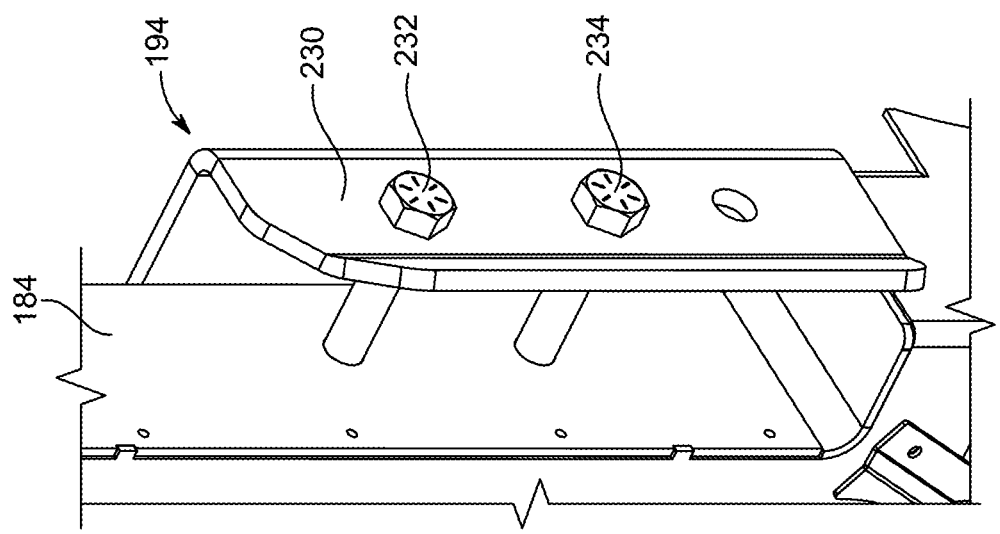
FIG. 22 presents a perspective view of a locked clevis utilized in the front loaded refuse collection vehicle.

Turning now to FIG. 22, lock clevis 194 is illustrated in perspective view. As shown, clevis 194 has a square plate to 230, which is coupled to a portion of tailgate 184. Coupled to both square plate 230 and tailgate 184 are a first locking pin 232 and a second locking pin 234. As will be appreciated, first locking pin 232 and second locking pin 234 are illustrated in FIG. 22 as bolts that are intended to be easily removable. In this embodiment, first locking pin 232 and second locking pin 234 are intended to have a shaft portion which is rotatable, although the pins will be securely held in place. As will be further discussed in detail below, first locking pin 232 and second locking pin 234 are intended to interact with first locking hook 212 and second locking hook 214, respectively, during locking operations.

Figure 23A:
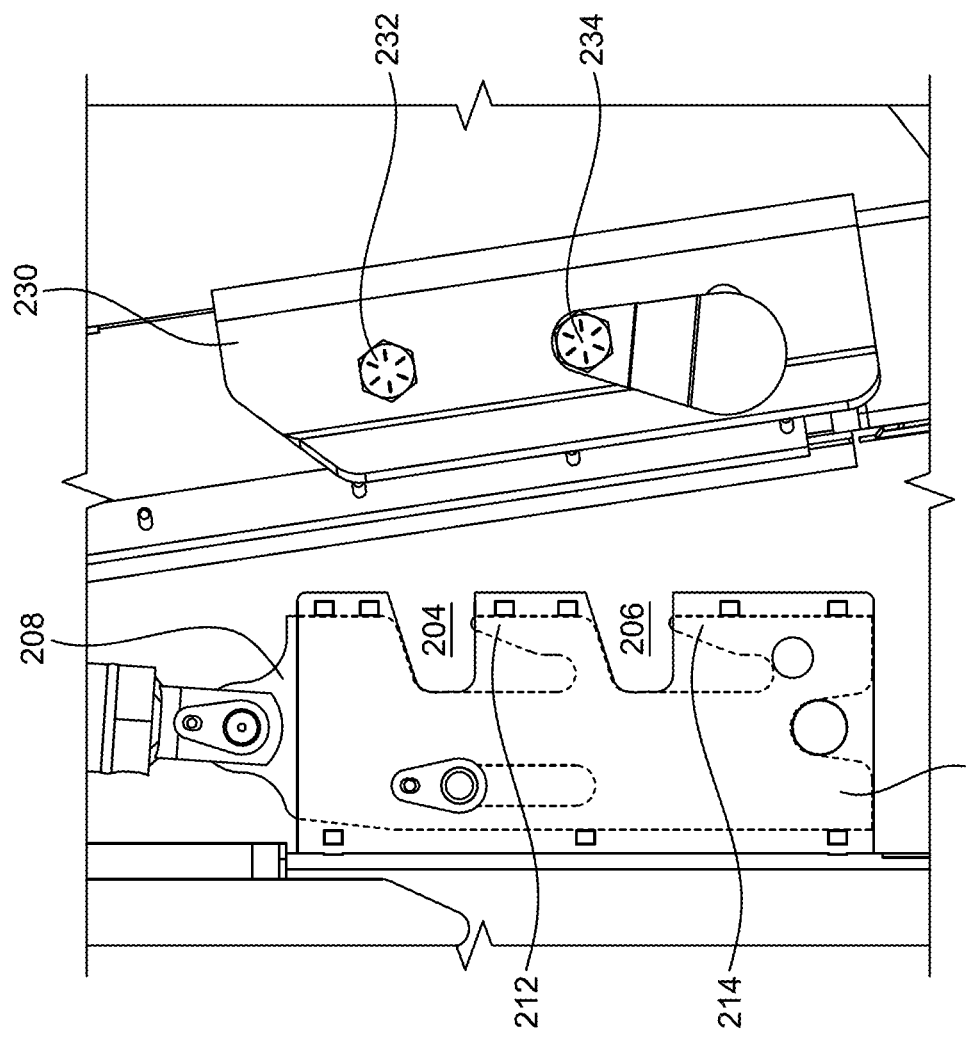

Turning now to FIGS. 23A and 23B, sectional views of various components making up lock assembly 190 are presented, to better illustrate relationships while in both the unlocked and locked positions. More specifically, FIG. 23A illustrates the unlocked position of lock plate 208, which will allow clevis 194 to move into a position which surrounds guideblock 196. Obviously, first locking pin 232 and second locking pin 234 will be inserted into first lock notch 204 and second lock notch 206 of guideblock 196, when moved into this position. In FIG. 23B, tailgate 184 has been moved to its closed position, and lock plate 108 has been moved into a locking position. As can be seen, first locking pin 232 and second locking pin 234 are held and contained behind first locking hook 212 and second locking hook 214, to provide secure and positive locking of tailgate 184.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A locking mechanism for positively locking a tailgate coupled to a vehicle, comprising:
    a guideblock coupled to the vehicle having an inner wall, an outer wall, an opening at an upper end thereof, a guide slot defined by the outer wall and the inner wall, and a lock notch opening in a side portion of the guideblock;
    a lockplate configured to be slidably received within the guide slot, the lockplate having a containment slot and a locking hook formed therein, the lockplate slidably movable between a locked position and an unlocked position;
    a capture pin removably coupled to the guideblock and positioned within the containment slot, wherein the capture pin is positioned at a first end of the containment slot when the lockplate is in the locked position and positioned at a second end of the containment slot when the lockplate is in the unlocked position;
    a lock clevis formed within the tailgate and configured to support a locking pin; and
    an actuator coupled to the tailgate and the lockplate, the actuator configured to move in an expanding direction which will provide an opening force which causes the lockplate to move in a first direction until the lockplate reaches the unlocked position, the actuator further configured to continue providing the opening force which will cause the tailgate to move in an opening direction, the actuator further configured to move in a contracting direction which will cause the tailgate to move in a closing direction until reaching a closed position, the actuator further configured to continue moving in the contracting direction thereby causing the lockplate to move from the unlocked position to the locked position;

wherein the lock clevis and the guideblock are positioned such that the lock clevis will partially surround the guideblock and the lock pin will be positioned within the lock notch opening when the tailgate is in the closed position, and wherein the lock pin is captured by the locking hook when the lockplate is moved from the unlocked position to the locked position.

2. The locking mechanism of claim 1 wherein the locking hook has an angled capture surface configured to generate a closing force further drawing the tailgate inwardly as the lockplate moves from the unlocked position to the locked position.

3. The locking mechanism of claim 2 wherein the locking pin is a bolt coupled to the clevis in a manner that allows for rotation thereof as the locking pin interacts with the locking hook.

4. The locking mechanism of claim 2 wherein the locking hook is formed in a side portion of the lockplate and comprises an opening slot and the angled capture surface is positioned adjacent the opening slot.

5. The locking mechanism of claim 1 wherein the actuator is a hydraulic cylinder.

6. The locking mechanism of claim 1 wherein the lockplate further includes a second locking hook and the lock clevis supports a second locking pin, and wherein the second locking pin is captured by the second locking hook as the lockplate is moved from the unlocked position to the locked position.

7. The locking mechanism of claim 1 wherein the vehicle is a refuse collection truck and the tailgate is rotatably coupled to a rear portion of the refuse collection truck.

8. The locking mechanism of claim 7 wherein the tailgate is rotatably coupled to the rear portion of the refuse collection truck by a hinge positioned at an upper location of the rear portion, and wherein the tailgate swings upwardly when moving from the closed position to the open position.

9. A locking mechanism carried by a refuse collection vehicle for locking a tailgate in a locked position and for allowing the tailgate to be unlocked and thus moved to an open position, the locking mechanism comprising:
 a lock clevis coupled to the tailgate and supporting a locking pin;
 a guideblock coupled to a body portion of the refuse collection vehicle, the guideblock having a guide slot therein and a lock notch positioned in a side portion thereof, the lock notch configured to receive the locking pin;
 a lockplate configured to be received within the guide slot and movable between a lock position and an unlock position, the lockplate having a containment slot therein and a locking hook positioned in a side portion thereof;
 a capture pin configured to be contained within a capture opening in the guideblock and positioned within the containment slot of the lockplate, the capture pin and the containment slot configured to allow the lockplate to translate within the guideblock between a lock position and an unlock position as guided by the configuration of the containment slot, wherein the capture pin is at a first location within the containment slot when lockplate is in the unlock position and the capture pin is at a second position within the containment slot when lockplate is in the lock position; and
 an actuator coupled at a first end to the lockplate and at a second end to the tailgate, the actuator configured to provide an opening force which, when the lockplate is in the lock position, will initially cause the lockplate to move to the unlock position and subsequently will cause movement of the tailgate in an opening direction, and the actuator further configured to provide a closing force which will cause the tailgate to move in a closing direction until reaching a closed position where the lock clevis will partially surround the guideblock and the locking pin is positioned within the lock notch, and wherein the actuator will continue to provide a closing force causing the lockplate to move to the lock position, and wherein moving the lockplate from the unlock position to the lock position will cause the locking hook to capture the locking pin.

10. The locking mechanism of claim 9 wherein the locking pin is a bolt coupled to the lock clevis in a manner that allows for rotation of the bolt with respect to the lock clevis.

11. The locking mechanism of claim 10 wherein the locking hook has a sloped surface which will contact the locking pin when the lockplate moves from the unlock position to the lock position, and the locking pin is allowed to roll on the sloped surface thus securing the tailgate in the locked position.

12. The locking mechanism of claim 9 wherein the tailgate is rotatably coupled to a rear portion of the refuse collection vehicle.

13. The locking mechanism of claim 9 wherein the guideblock comprises an inner wall and an outer wall forming the guide slot, both coupled to a body portion of the refuse collection vehicle.

14. The locking mechanism of claim 9 wherein the actuator is a hydraulic cylinder.

15. A locking mechanism couplable between a vehicle body and a tailgate for moving the tailgate between an open position allowing access to an internal portion of the vehicle body and a closed position enclosing the internal portion of the vehicle body, and for positively locking the tailgate in a locked position, the locking mechanism comprising:
 a guideblock having an opening extending from a side thereof and into a containing chamber, the guideblock further having a lock notch on an edge thereof;
 a lockplate received within the containing chamber, the lockplate having a containment slot within the lockplate and having a locking hook on one side thereof;
 a containing pin inserted through a pair of containing holes in the guideblock positioned on either side of the containing chamber to capture the containing pin in a fixed position, the containing pin further positioned within the containment slot within the lockplate, wherein the containment slot is configured to allow the lockplate to translate between an unlock position and a lock position as guided by the configuration of the containment slot, wherein the containing pin is at a first location within the containment slot when lockplate is in the unlock position and wherein the containing pin is at a second position within the containment slot when lockplate is in the lock position;

a lock clevis supporting a locking pin; and an actuator coupled to the lockplate to provide an opening force causing lockplate to move to the unlock position and to subsequently move the tailgate to the open position, and to provide a closing force causing the tailgate to move to the closed position and subsequently move the lockplate to the locked position, wherein moving the lockplate to the locked position causes the locking hook to capture the lock pin and to hold the tailgate in the locked position.

16. The closing mechanism of claim 15 wherein the lock clevis is coupled to the tailgate and the guideblock is coupled to the vehicle body.

17. The closing mechanism of claim 15 wherein the lock clevis is coupled to the vehicle body and the guideblock is coupled to the tailgate.

18. The locking mechanism of claim 9 wherein the lockplate moves in a linear manner within the guide slot.

19. The locking mechanism of claim 15 wherein the lockplate moves in a linear manner within the containing chamber.

20. The locking mechanism of claim 15 wherein moving the lockplate to capture the locking pin also causes the tailgate to be pulled into the locking position.

\* \* \* \* \*